United States Patent
Medlock et al.

(10) Patent No.: US 10,613,746 B2
(45) Date of Patent: *Apr. 7, 2020

(54) SYSTEM AND METHOD FOR INPUTTING TEXT

(71) Applicant: TOUCHTYPE LTD., London (GB)

(72) Inventors: Benjamin Medlock, London (GB); James Aley, London (GB); Douglas Alexander Harper Orr, Brentwood (GB)

(73) Assignee: Touchtype Ltd., London (GB)

( * ) Notice: Subject to any disclaimer, the term of this patent is extended or adjusted under 35 U.S.C. 154(b) by 373 days.

This patent is subject to a terminal disclaimer.

(21) Appl. No.: 15/389,294

(22) Filed: Dec. 22, 2016

(65) Prior Publication Data

US 2017/0102869 A1   Apr. 13, 2017

Related U.S. Application Data

(63) Continuation of application No. 14/372,445, filed as application No. PCT/GB2012/052981 on Nov. 30, 2012, now Pat. No. 9,563,348.

(30) Foreign Application Priority Data

Jan. 16, 2012 (GB) .................................. 1200643.3

(51) Int. Cl.
*G06F 3/048* (2013.01)
*G06F 3/0488* (2013.01)
(Continued)

(52) U.S. Cl.
CPC .......... *G06F 3/04883* (2013.01); *G06F 3/017* (2013.01); *G06F 3/0237* (2013.01);
(Continued)

(58) Field of Classification Search
CPC ...................................................... G06F 3/048
See application file for complete search history.

(56) References Cited

U.S. PATENT DOCUMENTS

| 5,027,406 A | 6/1991 | Roberts et al. |
| 5,477,451 A | 12/1995 | Brown et al. |

(Continued)

FOREIGN PATENT DOCUMENTS

| CN | 1387651 A | 12/2002 |
| CN | 1518829 A | 8/2004 |

(Continued)

OTHER PUBLICATIONS

"Non-Final Office Action Issued in U.S. Appl. No. 14/372,445", dated May 31, 2016, 25 Pages.

(Continued)

*Primary Examiner* — Pei Yong Weng
(74) *Attorney, Agent, or Firm* — Schwegman Lundberg & Woessner, P.A.

(57) ABSTRACT

A system comprising a feature identification means configured to generate one or more features from a plurality of samples, wherein each of the plurality of samples are sampled at a different time and correspond to a location of a single continuous gesture on a gesture-sensitive keyboard as the gesture is being performed and, wherein each of the one or more features relates to one of a plurality of targets of the gesture sensitive keyboard that a user may have intended to input when performing the gesture. The system comprises a prediction means configured to predict one or more terms from the one or more features, the prediction means comprising a prefix tree generating means configured to generate a prefix tree of terms which includes the one or more features, a path finding means configured to find one or more paths through the prefix tree of terms given the one (Continued)

or more features, and a predictor. A corresponding method is also provided.

27 Claims, 14 Drawing Sheets

(51) Int. Cl.
   *G06F 3/023*      (2006.01)
   *G06F 3/01*       (2006.01)
   *G06F 3/0481*     (2013.01)
   *G06F 17/27*      (2006.01)

(52) U.S. Cl.
   CPC .......... *G06F 3/0481* (2013.01); *G06F 3/0488* (2013.01); *G06F 3/04886* (2013.01); *G06F 17/276* (2013.01); *G06F 2203/04803* (2013.01)

(56) References Cited

U.S. PATENT DOCUMENTS

| | | |
|---|---|---|
| 5,510,981 A | 4/1996 | Berger et al. |
| 5,612,690 A | 3/1997 | Levy |
| 5,649,223 A | 7/1997 | Freeman |
| 5,664,059 A | 9/1997 | Zhao |
| 5,671,426 A | 9/1997 | Armstrong, III |
| 5,680,511 A | 10/1997 | Baker et al. |
| 5,748,512 A | 5/1998 | Vargas |
| 5,768,603 A | 6/1998 | Brown et al. |
| 5,805,832 A | 9/1998 | Brown et al. |
| 5,963,671 A | 10/1999 | Comerford et al. |
| 6,009,444 A | 12/1999 | Chen |
| 6,011,554 A | 1/2000 | King et al. |
| 6,052,443 A | 4/2000 | Perera et al. |
| 6,052,657 A | 4/2000 | Yamron et al. |
| 6,054,941 A | 4/2000 | Chen |
| 6,104,989 A | 8/2000 | Kanevsky et al. |
| 6,125,342 A | 9/2000 | Selesky |
| 6,182,027 B1 | 1/2001 | Nasukawa et al. |
| 6,204,848 B1 | 3/2001 | Nowlan et al. |
| 6,219,632 B1 | 4/2001 | Schumacher et al. |
| 6,236,958 B1 | 5/2001 | Lange et al. |
| 6,253,169 B1 | 6/2001 | Apte et al. |
| 6,275,792 B1 | 8/2001 | Lewis |
| 6,286,064 B1 | 9/2001 | King et al. |
| 6,304,841 B1 | 10/2001 | Berger et al. |
| 6,307,548 B1 | 10/2001 | Flinchem et al. |
| 6,307,549 B1 | 10/2001 | King et al. |
| 6,321,192 B1 | 11/2001 | Houchin et al. |
| 6,327,561 B1 | 12/2001 | Smith et al. |
| 6,362,752 B1 | 3/2002 | Guo et al. |
| 6,393,399 B1 | 5/2002 | Even |
| 6,460,015 B1 | 10/2002 | Hetherington et al. |
| 6,484,136 B1 | 11/2002 | Kanevsky et al. |
| 6,490,549 B1 | 12/2002 | Ulicny et al. |
| 6,519,557 B1 | 2/2003 | Emens et al. |
| 6,621,424 B1 * | 9/2003 | Brand .................. G06F 3/0237 341/22 |
| 6,625,600 B2 | 9/2003 | Lyudovyk et al. |
| 6,671,670 B2 | 12/2003 | Levin et al. |
| 6,724,936 B1 | 4/2004 | Riemer |
| 6,813,616 B2 | 11/2004 | Simpson et al. |
| 6,865,528 B1 | 3/2005 | Huang et al. |
| 6,885,317 B1 | 4/2005 | Gutowitz |
| 6,911,608 B2 | 6/2005 | Levy |
| 6,925,433 B2 | 8/2005 | Stensmo |
| 6,963,831 B1 | 11/2005 | Epstein |
| 6,965,856 B1 | 11/2005 | Stuermer |
| 6,993,476 B1 | 1/2006 | Dutta et al. |
| 7,075,520 B2 | 7/2006 | Williams |
| 7,092,870 B1 | 8/2006 | Chen et al. |
| 7,098,896 B2 | 8/2006 | Kushler et al. |
| 7,129,932 B1 | 10/2006 | Klarlund et al. |
| 7,175,438 B2 | 2/2007 | Levy |
| 7,177,795 B1 | 2/2007 | Chen et al. |
| 7,187,365 B2 | 3/2007 | Harman |
| 7,199,786 B2 | 4/2007 | Suraqui |
| 7,222,067 B2 | 5/2007 | Glushnev et al. |
| 7,250,938 B2 | 7/2007 | Kirkland et al. |
| 7,251,367 B2 | 7/2007 | Zhai |
| 7,269,546 B2 | 9/2007 | Stensmo |
| 7,366,666 B2 | 4/2008 | Balchandran et al. |
| 7,382,358 B2 | 6/2008 | Kushler et al. |
| 7,426,505 B2 | 9/2008 | Simpson et al. |
| 7,453,439 B1 | 11/2008 | Kushler et al. |
| 7,475,010 B2 | 1/2009 | Chao |
| 7,487,461 B2 | 2/2009 | Zhai et al. |
| 7,508,324 B2 | 3/2009 | Suraqui |
| 7,562,016 B2 | 7/2009 | Balchandran et al. |
| 7,580,829 B2 | 8/2009 | James et al. |
| 7,610,189 B2 | 10/2009 | Mackie |
| 7,610,191 B2 | 10/2009 | Gao et al. |
| 7,706,616 B2 | 4/2010 | Kristensson et al. |
| 7,750,891 B2 | 7/2010 | Stephanick et al. |
| 7,809,575 B2 | 10/2010 | Ativanichayaphong et al. |
| 7,814,088 B2 | 10/2010 | Simpson et al. |
| 7,895,518 B2 | 2/2011 | Kristensson |
| 7,920,132 B2 | 4/2011 | Longe et al. |
| 7,996,211 B2 | 8/2011 | Gao et al. |
| 8,010,343 B2 | 8/2011 | Agapi et al. |
| 8,032,358 B2 | 10/2011 | Helletzgruber et al. |
| 8,073,698 B2 | 12/2011 | Ativanichayaphong et al. |
| 8,074,172 B2 | 12/2011 | Kocienda et al. |
| 8,117,144 B2 | 2/2012 | Angell et al. |
| 8,136,050 B2 | 3/2012 | Sacher et al. |
| 8,200,487 B2 | 6/2012 | Peters et al. |
| 8,225,203 B2 | 7/2012 | Unruh |
| 9,384,185 B2 | 7/2016 | Medlock et al. |
| 10,037,319 B2 | 7/2018 | Medlock et al. |
| 2002/0045463 A1 | 4/2002 | Chen et al. |
| 2002/0049539 A1 * | 4/2002 | Russell .................. G01S 13/931 701/301 |
| 2002/0111806 A1 | 8/2002 | Franz et al. |
| 2002/0152203 A1 | 10/2002 | Ostergaard et al. |
| 2002/0196163 A1 | 12/2002 | Bradford et al. |
| 2003/0007018 A1 | 1/2003 | Seni et al. |
| 2003/0011574 A1 | 1/2003 | Goodman |
| 2003/0078915 A1 * | 4/2003 | chaudhuri .......... G06F 16/24578 |
| 2003/0097252 A1 | 5/2003 | Mackie |
| 2003/0144830 A1 | 7/2003 | Williams |
| 2004/0021691 A1 | 2/2004 | Dostie et al. |
| 2004/0083198 A1 | 4/2004 | Bradford et al. |
| 2004/0136564 A1 | 7/2004 | Roeber et al. |
| 2004/0140956 A1 | 7/2004 | Kushler et al. |
| 2004/0156562 A1 | 8/2004 | Mulvey et al. |
| 2004/0201607 A1 | 10/2004 | Mulvey et al. |
| 2005/0044495 A1 | 2/2005 | Lee et al. |
| 2005/0172734 A1 | 8/2005 | Alsio et al. |
| 2005/0198023 A1 | 9/2005 | James et al. |
| 2005/0200609 A1 | 9/2005 | Van Der Hoeven |
| 2005/0210020 A1 | 9/2005 | Gunn et al. |
| 2005/0273724 A1 | 12/2005 | Joeressen et al. |
| 2006/0055669 A1 | 3/2006 | Das |
| 2006/0117307 A1 | 6/2006 | Averbuch et al. |
| 2006/0159507 A1 | 7/2006 | Jawerth et al. |
| 2006/0167872 A1 | 7/2006 | Parikh |
| 2006/0206337 A1 | 9/2006 | Paek et al. |
| 2006/0265208 A1 | 11/2006 | Assadollahi |
| 2006/0274051 A1 | 12/2006 | Longe et al. |
| 2006/0290656 A1 | 12/2006 | Soong et al. |
| 2007/0055933 A1 | 3/2007 | Dejean et al. |
| 2007/0067744 A1 | 3/2007 | Lane et al. |
| 2007/0094024 A1 | 4/2007 | Kristensson et al. |
| 2007/0115343 A1 | 5/2007 | Lessing |
| 2007/0152979 A1 | 7/2007 | Jobs et al. |
| 2008/0001785 A1 | 1/2008 | Elizarov et al. |
| 2008/0040099 A1 | 2/2008 | Wu et al. |
| 2008/0040114 A1 | 2/2008 | Zhou et al. |
| 2008/0126075 A1 | 5/2008 | Thorn |
| 2008/0126314 A1 | 5/2008 | Thorn |
| 2008/0177551 A1 | 7/2008 | Schalk |
| 2008/0189605 A1 | 8/2008 | Kay et al. |
| 2008/0195374 A1 | 8/2008 | Holubar et al. |
| 2008/0195388 A1 | 8/2008 | Bower et al. |

(56) References Cited

U.S. PATENT DOCUMENTS

| | | |
|---|---|---|
| 2008/0259022 A1 | 10/2008 | Mansfield et al. |
| 2008/0270896 A1* | 10/2008 | Kristensson .......... G06F 3/0237 715/261 |
| 2008/0281974 A1* | 11/2008 | Slothouber ......... G06F 16/9535 709/229 |
| 2008/0285857 A1 | 11/2008 | Sharan et al. |
| 2009/0007001 A1 | 1/2009 | Morin et al. |
| 2009/0112647 A1 | 4/2009 | Volkert |
| 2009/0150322 A1 | 6/2009 | Bower et al. |
| 2009/0170536 A1 | 7/2009 | Rang et al. |
| 2009/0174667 A1 | 7/2009 | Kocienda et al. |
| 2009/0192786 A1 | 7/2009 | Assadollahi |
| 2009/0193334 A1 | 7/2009 | Assadollahi |
| 2009/0213134 A1* | 8/2009 | Stephanick ........... G06F 3/0236 345/589 |
| 2009/0216690 A1 | 8/2009 | Badger et al. |
| 2009/0284471 A1 | 11/2009 | Longe et al. |
| 2010/0001958 A1 | 1/2010 | Lu et al. |
| 2010/0017393 A1 | 1/2010 | Broicher et al. |
| 2010/0121870 A1 | 5/2010 | Unruh et al. |
| 2010/0171700 A1 | 7/2010 | Sharan et al. |
| 2010/0211378 A1 | 8/2010 | Bulyko |
| 2010/0235780 A1 | 9/2010 | Westerman et al. |
| 2010/0257478 A1 | 10/2010 | Longe et al. |
| 2010/0299135 A1 | 11/2010 | Fritsch et al. |
| 2010/0315266 A1 | 12/2010 | Gunawardana et al. |
| 2011/0047456 A1 | 2/2011 | Sharan et al. |
| 2011/0063231 A1 | 3/2011 | Jakobs et al. |
| 2011/0082686 A1* | 4/2011 | Suraqui ................. G06F 3/0237 704/9 |
| 2011/0106792 A1 | 5/2011 | Robertson |
| 2011/0122081 A1 | 5/2011 | Kushler |
| 2011/0179032 A1 | 7/2011 | Ceusters et al. |
| 2011/0197128 A1 | 8/2011 | Assadollahi |
| 2011/0202876 A1 | 8/2011 | Badger et al. |
| 2011/0205160 A1 | 8/2011 | Song et al. |
| 2011/0234524 A1* | 9/2011 | Longe ................... G06F 3/0237 345/173 |
| 2012/0010875 A1 | 1/2012 | Helletzgruber et al. |
| 2012/0036469 A1 | 2/2012 | Suraqui |
| 2012/0150532 A1 | 6/2012 | Mirowski et al. |
| 2012/0167009 A1 | 6/2012 | Davidson et al. |
| 2012/0197825 A1 | 8/2012 | Medlock et al. |
| 2012/0268381 A1 | 10/2012 | Unruh |
| 2013/0021286 A1 | 1/2013 | Sudo |
| 2013/0046544 A1 | 2/2013 | Kay et al. |
| 2013/0246329 A1 | 9/2013 | Pasquero et al. |
| 2013/0253912 A1 | 9/2013 | Medlock et al. |
| 2014/0351741 A1 | 11/2014 | Medlock et al. |
| 2016/0283464 A1 | 9/2016 | Medlock et al. |

FOREIGN PATENT DOCUMENTS

| | | |
|---|---|---|
| CN | 1783066 A | 6/2006 |
| CN | 1871597 A | 11/2006 |
| CN | 1954315 A | 4/2007 |
| CN | 101122901 A | 2/2008 |
| CN | 101286094 A | 10/2008 |
| CN | 102117175 A | 7/2011 |
| CN | 102253929 A | 11/2011 |
| EP | 1724692 A2 | 11/2006 |
| JP | S6418871 A | 1/1989 |
| JP | H05290030 A | 11/1993 |
| JP | H10275046 A | 10/1998 |
| JP | H11167569 A | 6/1999 |
| JP | 2001249754 A | 9/2001 |
| JP | 3403838 B2 | 5/2003 |
| JP | 2005196759 A | 7/2005 |
| JP | 2006127488 A | 5/2006 |
| JP | 2011090356 A | 5/2011 |
| JP | 2011221759 A | 11/2011 |
| WO | 1999059310 A2 | 11/1999 |
| WO | 2007035827 A2 | 3/2007 |
| WO | 2008133619 A2 | 11/2008 |
| WO | 2010086770 A1 | 8/2010 |
| WO | 2010112841 A1 | 10/2010 |
| WO | 2011042710 A1 | 4/2011 |
| WO | 2011107751 A2 | 9/2011 |
| WO | 2011113057 A1 | 9/2011 |
| WO | 2011126122 A1 | 10/2011 |
| WO | 2011143827 A1 | 11/2011 |
| WO | 2012042217 A1 | 4/2012 |

OTHER PUBLICATIONS

"Notice of Allowance Issued in U.S. Appl. No. 14/372,445", dated Sep. 23, 2016, 16 Pages.

"Office Action Issued in Japanese Patent Application No. 2014-551669", dated Oct. 4, 2016, 10 Pages.

Katayama, et al. "A Input Complementary Method for One-Handed Keyboard", In IPSJ SIG Technical Report, vol. 2009-UBI-24, Issue 17, Nov. 2009, 8 Pages.

"International Search Report and Written Opinion Issued in PCT Application No. PCT/GB2012/052981", dated Mar. 11, 2013, 9 Pages.

Tokunaga, et al. "Conversion of Kana Into Kanji Realized? The Japanese Input made and studied", In WEB-DB Press, the first edition, vol. 64, Sep. 2011, 10 Pages.

"First Office Action and Search Report Issued in Chinese Patent Application No. 201280067256.3", dated Jun. 2, 2016, 21 Pages.

"Second Office Action Issued in Chinese Patent Application No. 201280067256.3", dated Jan. 13, 2017, 18 Pages.

"LingPipe 4.1.0", Retrieved from http://alias-i.com/lingpipe, Apr. 17, 2013, 18 Pages.

Thede, et al., "A Second-Order Hidden Markov Model for Part-of-Speech Tagging", In Proceedings of the 37th Annual Meeting of the Association for Computational Linguistics on Computational Linguistics, Jun. 20, 1999, pp. 175-182.

"Office Action Issued in European Patent Application No. 11770852.9", dated Dec. 12, 2017, 6 Pages.

"Non-Final Office Action Issued in U.S. Appl. No. 13/876,159", dated Sep. 4, 2015, 26 Pages.

"Notice of Allowance Issued in U.S. Appl. No. 13/876,159", dated Mar. 11, 2016, 14 Pages.

"Application Filed under United Kingdom Patent Application No. 0917753.6", Filed Date: Oct. 9, 2009, 34 Pages.

"Office Action Issued in European Patent Application No. 13702263.8", dated Apr. 3, 2017, 6 Pages.

"Office Action Issued in European Patent Application No. 13702263.8", dated Apr. 19, 2018, 8 Pages.

"Office Action Issued in European Patent Application No. 13702263.8", dated Jun. 27, 2017, 5 Pages.

"Advisory Action Issued in U.S. Appl. No. 14/341,717", dated Feb. 3, 2017, 3 Pages.

"Applicant Initiated Interview Summary Issued in U.S. Appl. No. 14/341,717", dated Oct. 27, 2016, 3 Pages.

"Applicant Initiated Interview Summary Issued in U.S. Appl. No. 14/341,717", dated Jan. 12, 2017, 3 Pages.

"Applicant Initiated Interview Summary Issued in U.S. Appl. No. 14/341,717", dated Sep. 28, 2017, 3 Pages.

"Final Office Action Issued in U.S. Appl. No. 14/341,717", dated Nov. 22, 2016, 19 Pages.

"Non-Final Office Action Issued in U.S. Appl. No. 14/341,717", dated Jul. 28, 2016, 20 Pages.

"Non-Final Office Action Issued in U.S. Appl. No. 14/341,717", dated Jun. 23, 2017, 22 Pages.

"Notice of Allowance Issued in U.S. Appl. No. 14/341,717", dated Nov. 29, 2017, 16 Pages.

"Preliminary Amendment filed in U.S. Appl. No. 14/341,717", dated Dec. 18, 2014, 3 Pages.

"PTO Response to Rule 312 Communication in U.S. Appl. No. 14/341,717", dated Feb. 21, 2018, 2 Pages.

"PTO Response to Rule 312 Communication U.S. Appl. No. 14/341,717", dated Jun. 21, 2018, 2 Pages.

"Final Office Action Issued in U.S. Appl. No. 15/173,412", dated Apr. 16, 2018, 55 Pages.

(56) References Cited

OTHER PUBLICATIONS

"Non-Final Office Action Issued in U.S. Appl. No. 15/173,412", dated Dec. 11, 2017, 49 Pages.
"Notice of Allowance Issued in U.S. Appl. No. 15/173,412", dated Jul. 17, 2018, 12 Pages.
"First Office Action and Search Report Issued in Chinese Patent Application No. 201180053255.9", dated Jun. 3, 2015, 32 Pages.
"Fourth Office Action Issued in Chinese Patent Application No. 201180053255.9", dated Jan. 3, 2017, 20 Pages.
"Notice of Allowance Issued in China Patent Application No. 201180053255.9", dated Jun. 16, 2017, 4 Pages.
"Second Office Action Issued in Chinese Patent Application No. 201180053255.9", dated Dec. 25, 2015, 31 Pages.
"Third Office Action Issued in Chinese Patent Application No. 201180053255.9", dated Jul. 4, 2016, 20 Pages.
"Notice of Allowance Issued in Chinese Patent Application No. 201280067256.3", dated Jul. 20, 2017, 4 Pages.
"First Office Action and Search Report Issued in Chinese Patent Application No. 201380006966.X", dated May 4, 2016, 17 Pages.
"Notice of Allowance Issued in Chinese Patent Application No. 201380006966.X", dated Aug. 24, 2017, 4 Pages.
"Second Office Action and Search Report Issued in Chinese Patent Application No. 201380006966.X", dated Dec. 14, 2016, 16 Pages.
"Third Office Action Issued in Chinese Application No. 201380006966.X", dated May 31, 2017, 8 Pages.
"Notice of Allowance Issued in Japanese Patent Application No. 2014-553807", dated Apr. 9, 2018, 8 Pages.
"Office Action Issued in Japanese Patent Application No. 2014-553807", dated Jan. 23, 2017, 12 Pages.
"Office Action Issued in Japanese Patent Application No. 2014-553807", dated Aug. 4, 2017, 7 Pages.
Briscoe, et al., "The Second Release of the RASP System", In Proceedings of the COLING/ACL on Interactive Presentation Sessions, Jul. 17, 2006, pp. 77-80.
"International Search Report and Written Opinion Issued in PCT Application No. PCT/GB2011/001419", dated Dec. 20, 2011, 12 Pages.
"International Search Report and Written Opinion Issued in PCT Application No. PCT/GB2013/050182", dated Apr. 25, 2013, 12 Pages.
Scheffler, Carl, "Improving PPM", Retrieved from www.inference.org.uk/cs482/publications/scheffler2008improving.ps.gz, Mar. 24, 2008, pp. 1-13.
"Office Action Issued in European Patent Application No. 12808871.3", dated Jun. 5, 2018, 4 Pages.
"Office Action Issued in Japanese Patent Application No. 2017-126156", dated Apr. 11, 2018, 13 Pages.
"Office Action Issued in Chinese Application No. 201280067256.3", dated Apr. 7, 2017, 6 Pages.
"Office Action Issued in European Patent Application No. 12808871.3", dated Aug. 2, 2017, 8 Pages.
Bharadwaj, Krishna, "How Swype Works?", Retrieved from <<http://www.krishnabharadwaj.info/how-swype-works/>>, Jul. 2, 2011, 5 Pages.
"Office Action Issued in Korean Patent Application No. 10-2014-7022433", dated Mar. 20, 2019, 8 Pages.

* cited by examiner

Prefix Tree for the dictionary. (dog, of, cat, cab)

Generated sub-graph from prefix tree, with costs associated to edges representing relevant routes.

SYSTEM AND METHOD FOR INPUTTING TEXT

CROSS REFERENCE TO RELATED APPLICATIONS

This application a continuation of U.S. patent application Ser. No. 14/372,445 filed Jul. 15, 2014, which is the National State of International Application No. PCT/GB2012/052981 filed Nov. 30, 2012, which claims the benefit of Great Britain Patent Application No. 1200643.3, filed Jan. 16, 2012, the disclosures of which are incorporated herein by reference in their entireties.

FIELD OF THE INVENTION

The present invention relates to a system and method for predicting one or more terms from a user gesture across a gesture-sensitive keyboard. In particular, the one or more terms may be predicted from a single continuous gesture by a user.

BACKGROUND

There are existing systems which predict single words on the basis of a user "stroke" across a touch-sensitive keyboard/screen.

One such system, as disclosed in U.S. Pat. No. 7,098,896, titled "System and Method for Continuous Stroke Word-based text input", comprises a store of words in a database. The method of predicting a word from the input stroke pattern comprises comparing the input stroke pattern with a set of the words in the database. The method comprises identifying a "final touch point" in the stroke pattern in order to identify the terminating character for a candidate word. Predictions for candidate words are then based on the first and last characters of the word, where these characters have been identified from the input stroke pattern. The actual path length of the inputted stroke pattern is compared to an expected path length which is stored with each word in the database of words.

An alternative approach to predicting a word from a continuous stroke has been disclosed in U.S. Pat. No. 7,251,367, titled "System and Method for Recognizing Word Patterns Based on a Virtual Keyboard Layout". In this disclosure, stroke input patterns are compared, again within a single-word boundary, to a pre-determined library of stroke patterns. This technique has been demonstrated both with a completely pre-defined library and with a dynamically generated library.

All of the known systems, including those discussed above, are based around the principle of solving the problem of matching an input stroke, which is intended to represent a word, with a word in a database, based on the input stroke pattern and defined start and end points that correspond (approximately) to the start and end characters of individual words within the database.

The problem with the known systems and methods is that the input strokes are restricted to correspondence with the start and end characters of words in the database, requiring and restricting the user to enter strokes corresponding to full single words. Thus, the known systems and methods cannot predict words based on an input stroke which corresponds to the prefix of a word or an input stroke which corresponds to multiple words, for example where the user is trying to input a phrase with a single continuous stroke. It is an objective of the present invention to solve the above mentioned problems.

SUMMARY OF THE INVENTION

In a first aspect of the invention there is provided a method for predicting one or more terms from a single continuous gesture across a gesture-sensitive keyboard. The method comprises:
sampling at a plurality of times the location of the gesture on the gesture-sensitive keyboard as the gesture is performed; and predicting one or more terms from the plurality of samples by: generating one or more features from the plurality of samples, wherein each of the one or more features relates to a target on the gesture-sensitive keyboard that a user may have intended to input when performing the gesture; generating a prefix tree of terms which includes the one or more features; finding one or more paths through the prefix tree of terms given the one or more features.

Preferably, the prefix tree of terms is represented by a graph, and including generating the graph using graph theory.

Generating one or more features from the plurality of samples preferably comprises identifying a location of the gesture on the gesture-sensitive keyboard where the user may have intended to pass through a target of the gesture-sensitive keyboard. The location of the feature is preferably the location of the gesture where the gesture passes closest to the target. The target may be a point target or a line target. Preferably, a feature is identified for each target on the gesture-sensitive keyboard. Preferably, a feature is only retained if the minimum distance between the feature and the target is below a threshold distance.

Each feature may comprise a distance metric which corresponds to the minimum distance between the gesture and the target.

The prefix tree of terms is preferably generated by retaining the terms of a dictionary prefix tree which are allowed given the one or more features. A term of the dictionary prefix tree may be retained even if a feature does not correspond to that term.

The targets of the gesture-sensitive keyboard may correspond to the letters of the alphabet, and optionally word boundary delimiters, such as a space, and/or punctuation symbols. The prefix tree of terms may comprise one or more nodes representing the last letter of a completed word, wherein generating the prefix tree of terms may further comprise inserting a node corresponding to a space character into the prefix tree where there is a node corresponding to the last letter in a word. The probability associated with the node corresponding to the space character is preferably reduced if a feature associated with that space character has not been identified. Generating the prefix tree of terms may further comprise generating at the node corresponding to the space character, a new prefix tree of terms generated by retaining the terms of a dictionary prefix tree which are allowed given the remaining features in a sequence of one or more features.

The method preferably comprises pruning the prefix tree of terms to remove all paths through the prefix tree of terms for which the ratio of the probability of a given path over the probability of the most likely path is below a predetermined threshold. The node representing a space character may comprise meta-data to prune the new prefix tree of terms on the basis of context data.

Generating the prefix tree of terms may further comprise allowing a given feature to represent a repeated instance of the character it relates to, by retaining the terms of a dictionary prefix tree which include character repetition if there is a valid path given the one or more features through the prefix tree for this repeated character.

In one embodiment, finding one or more paths through the prefix tree of terms comprises using a path-finding algorithm. The path-finding algorithm may use the distance metrics to generate a probability estimate associated with each path through the prefix tree of terms. The path-finding algorithm is preferably configured to return as the one or more terms, terms for which the corresponding route has a probability estimate above a threshold value.

In an alternative embodiment, finding one or more paths through the prefix tree of terms comprises: identifying one or more features which correspond to the end location of the gesture: and assigning an indication of the cumulative probability for a given path to any node representing the one or more features that correspond to the location of the end of the gesture, only if that node corresponds to a leaf of the prefix tree of terms. The one or more paths may be ordered by their cumulative probabilities and the path(s) for which the cumulative probability is above a threshold value are returned, wherein the returned one or more paths correspond to the one or more terms.

In either embodiment of the path finding means, the one or more terms is predicted on the basis of all the currently available samples. The method may comprise periodically updating the prediction of the one or more terms as the single continuous stroke is being performed and more samples are generated.

Predicting the one or more terms may comprise predicting one or more words. The one or more words may be predicted on the basis of a single continuous gesture which corresponds to the user gesturing over one or more characters on a gesture-sensitive keyboard intended to indicate the prefix for that word. Predicting the one or more words may comprise predicting a phrase comprising a sequence of two or more words on the basis of a single continuous gesture which corresponds to the user gesturing over characters for multiple words on a gesture-sensitive keyboard. Preferably, the method comprises using context information to tailor the prediction of one or more terms.

Preferably, sampling is performed at a predetermined frequency. The sampling frequency may be about 60 Hz.

The prediction of the one or more terms is preferably based on the topography of the gesture-sensitive keyboard in combination with gesture velocity and/or gesture curve direction. The probability of a path through the prefix tree may be dependent on the topography of the gesture between two features and the targets of the keyboard associated with those two features. The probability of the path may be based on a monotonically decreasing function of the difference between a straight-line distance between the two targets and the curved length of the gesture between the two targets. The probability of the path may be based on a monotonically decreasing function of the difference between the direction of a straight-line between the two targets and the gesture direction at each point between the two targets.

The gesture may be a stroke and the gesture-sensitive keyboard is a touch-sensitive keyboard. The method may comprise detecting pressure from a user stroking the keyboard to form the single continuous stroke and the step of sampling comprises sampling the location at which pressure is present. The sampling may comprise detecting a pressure value and a location at a given time.

In a second aspect of the invention, there is provided a computer program product comprising a computer readable medium having stored thereon computer program means for causing a processor to carry out a method as described above.

In a third aspect of the invention, there is provided a system. The system comprises a feature identification means configured to generate one or more features from a plurality of samples, wherein each of the plurality of samples is sampled at a different time and corresponds to a location of a single continuous gesture on a gesture-sensitive keyboard as the gesture is being performed and, wherein each of the one or more features relates to one of a plurality of targets of the gesture sensitive keyboard that a user may have intended to input when performing the gesture; and a prediction means configured to predict one or more terms from the one or more features, the prediction means comprising: a prefix tree generating means configured to generate a prefix tree of terms which includes the one or more features; a path finding means configured to find one or more paths through the prefix tree of terms given the one or more features; and a predictor.

The system further comprises a gesture-sensitive keyboard comprising a plurality of targets and configured to receive a single continuous gesture as input.

The system may further comprise a sampling means for sampling at a plurality of times the location of the gesture on the gesture-sensitive keyboard as the gesture is performed.

The prefix tree generating means may be configured to generate a graph by graph theory, wherein the graph represents the prefix tree of terms.

The feature identification means is preferably configured to generate one or more features from the plurality of samples by identifying a location of the gesture on the gesture-sensitive keyboard where the user may have intended to pass through a target of the gesture-sensitive keyboard. The location of the feature is preferably the location of the gesture where the gesture passes closest to the target. The target may be a point target or a line target. The feature identification means is preferably configured to identify a feature for each of the plurality of targets and may be configured to retain a feature only if the minimum distance between the feature and the target is below a threshold distance.

Preferably, each feature comprises a distance metric which corresponds to the minimum distance between the gesture and the target.

The prefix tree generating means is preferably configured to generate the prefix tree of terms by retaining the terms of a dictionary prefix tree which are allowed given the one or more features. A term of the dictionary prefix tree may be retained even if a feature does not correspond to that term.

The plurality of targets may correspond to the letters of the alphabet, and optionally word boundary delimiters, such as a space, and/or punctuation symbols. The prefix tree of terms may comprise one or more nodes representing the last letter of a completed word, and the prefix tree generating means is configured to insert a node corresponding to a space character into the prefix tree where there is a node corresponding to the last letter in a word. Preferably, the prefix tree generating means is configured to reduce the probability associated with the node corresponding to the space character, if the feature identification means has not identified a feature associated with that space character. The prefix tree generating means is preferably configured to generate at the node corresponding to the space character, a new prefix tree of terms generated by retaining the terms of a dictionary prefix tree which are allowed given the remaining features in a sequence of one or more features.

The prefix tree generating means may be configured to prune the prefix tree of terms to remove all paths through the graph for which the probability of the path is below a predetermined threshold. The prefix tree generating means is preferably configured to associate meta-data with the node representing a space character to prune the new prefix tree of terms on the basis of context data.

The prefix tree generating means may be configured to allow a given feature to represent a repeated instance of the character is relates to, by retaining the terms of a dictionary prefix tree which include character repetition if there is a valid path given the one or more features through the prefix tree for this repeated character.

In one embodiment, the path finding means is a path-finding algorithm. The path-finding algorithm may be configured to use the distance metrics to generate a probability estimate associated with each path through the prefix tree of terms. The path-finding algorithm is preferably configured to return as the one or more terms, terms for which the corresponding route has a probability estimate above a threshold value.

In an alternative embodiment, the feature identification means is configured to determine one or more features which correspond to the end location of the gesture, and the prefix tree generating means is configured to assign an indication of the cumulative probability for a given path to any node representing the one or more features that correspond to the location of the end of the gesture, only if that node corresponds to a leaf of the prefix tree of terms. The path finding means is preferably configured to order the cumulative probabilities and to return as the one or more terms, terms for which the corresponding route has a cumulative probability estimate above a threshold value.

The predictor is preferably configured to predict the one or more terms on the basis of all the currently available samples and may be configured to periodically update the prediction for the one or more terms as the single continuous stroke is being performed and the sampling means generates more samples.

The predictor is preferably configured to predict one or more words. The predictor may be configured to predict the one or more words on the basis of a single continuous gesture which corresponds to the user gesturing over one or more characters on a gesture-sensitive keyboard intended to indicate the prefix for that word. The predictor may be configured to predict a phrase comprising a sequence of two or more words on the basis of a single continuous gesture which corresponds to the user gesturing over characters for multiple words on a gesture-sensitive keyboard. The predictor is preferably configured to use context information to tailor the prediction of one or more terms.

The sampling means is preferably configured to sample at a predetermined frequency. The sampling frequency may be about 60 Hz.

The predictor is preferably configured to predict the one or more terms on the basis of the topography of the gesture-sensitive keyboard in combination with gesture velocity and/or gesture curve direction. The predictor is preferably configured to predict a path through the prefix tree dependent on the topography of the gesture between two features and the targets of the keyboard associated with those two features. The probability of the path may be based on a monotonically decreasing function of the difference between a straight-line distance between the two targets and the curved length of the gesture between the two targets. The probability of the path may be based on a monotonically decreasing function of the difference between the direction of a straight-line between the two targets and the gesture direction at each point between the two targets.

The gesture-sensitive keyboard is preferably a touch-sensitive keyboard and the single continuous gesture is a stroke across the touch-sensitive keyboard. The touch-sensitive keyboard may be configured to detect pressure from a user stroking the touch-sensitive keyboard and the sampling means is configured to sample the location of the stroke at which pressure is present. The sampling means may be configured to detect a pressure value and a location at a given time.

BRIEF DESCRIPTION OF THE DRAWINGS

The present invention will now be described in detail with reference to the accompanying drawings, in which.

DETAILED DESCRIPTION OF THE INVENTION

The disclosed system and method allows a user to enter arbitrary length sequences of character-based input, potentially consisting of multiple words or a prefix for a word, with a single continuous stroke, while maintaining regular feedback in the form of a prefix, word and/or phrase predictions.

Thus, the system and method of the present invention provides text entry for a gesture-sensitive device where users can perform a single continuous gesture to indicate intended word or phrase input. For the examples that follow, there is described a touchscreen or touch-sensitive device. A touchscreen device of the described embodiment allows a user to enter words or phrases without requiring the user to break contact with the screen between letters or words, by moving their finger to select characters in sequence while the system simultaneously processes the input and produces predictions.

The present invention offers a significant improvement over known devices because it provides more accurate and flexible text entry with an increased speed in which text can be inputted.

A user input gesture, which for the purposes of the described embodiment of a touchscreen device, will be referred to as a "stroke", and is terminated by the user lifting their finger off the touchscreen. The system interprets the user breaking contact with the screen as an indication that there are no more words from this point, in this particular stroke.

The present system and method makes term predictions on the basis of a continuous stream of samples, each sample representing the location of the gesture in time, whilst the gesture is being performed. By sampling in this way, the system and method is able to function at a higher level of functionality than word-matching systems. The system and method of the present invention is thus able to provide scalability in both directions, i.e. to less than one word (a prefix) or to several words at a time, thereby solving problems with the known systems and methods and providing a more flexible alternative, as will be discussed in relation to FIGS. 1 and 2.

Figure 1:
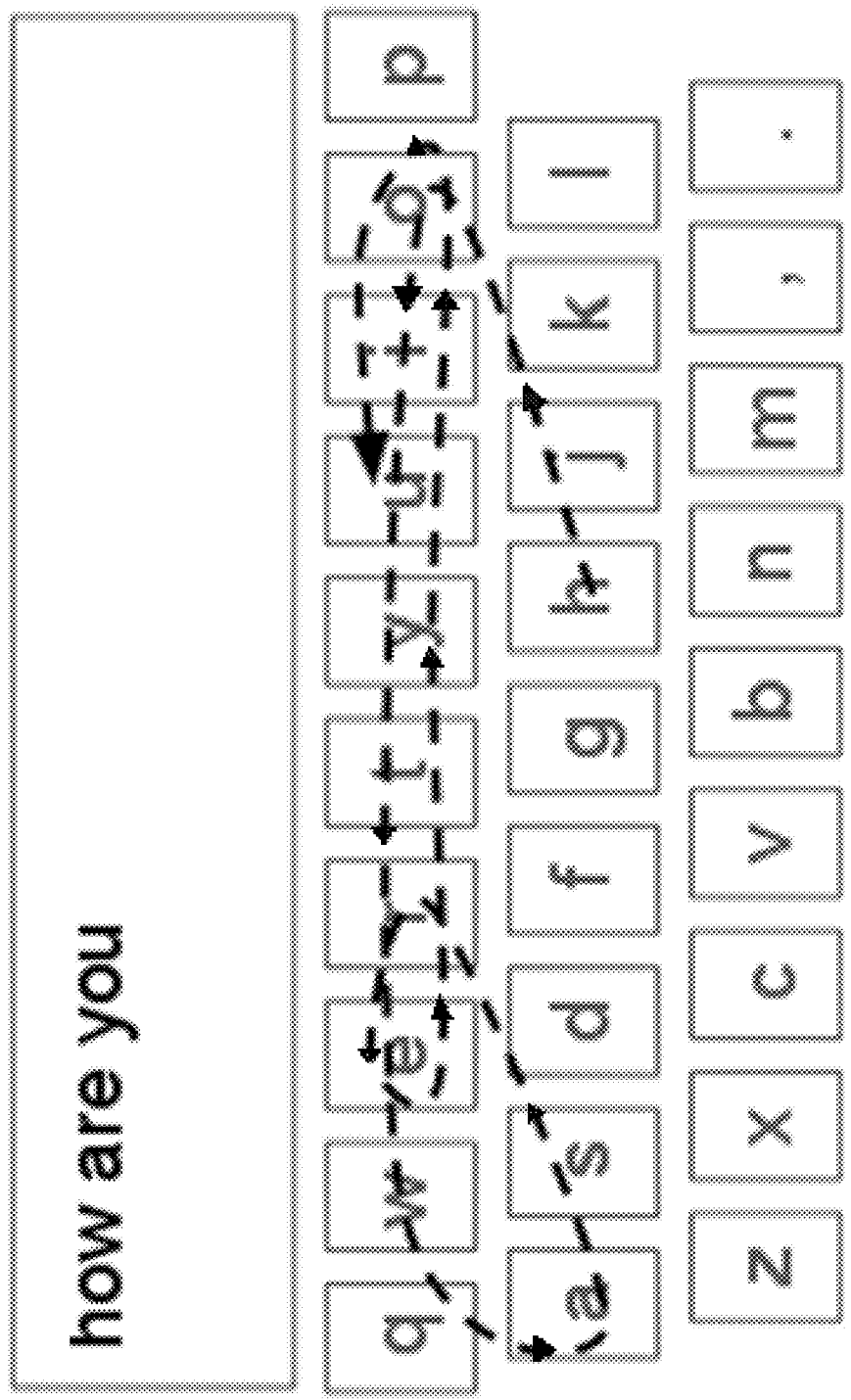
FIG. 1 is an illustration of the use of the method and system of the present invention and, in particular, illustrates a single continuous user gesture across a user interface comprising a gesture-sensitive keyboard to input a phrase and the corresponding predicted phrase which is displayed on a display of the user interface.

FIG. 1 shows an example of a user gesture, intended to indicate multiple words, in this case "How are you", traced across a touch-sensitive keyboard. As illustrated, there is no requirement for the user to lift their finger from the screen between words. The probabilistic approach this system takes (as will be described below) means that for natural language, it is possible to infer the presence of spaces for likely candidate phrases.

Figure 2:
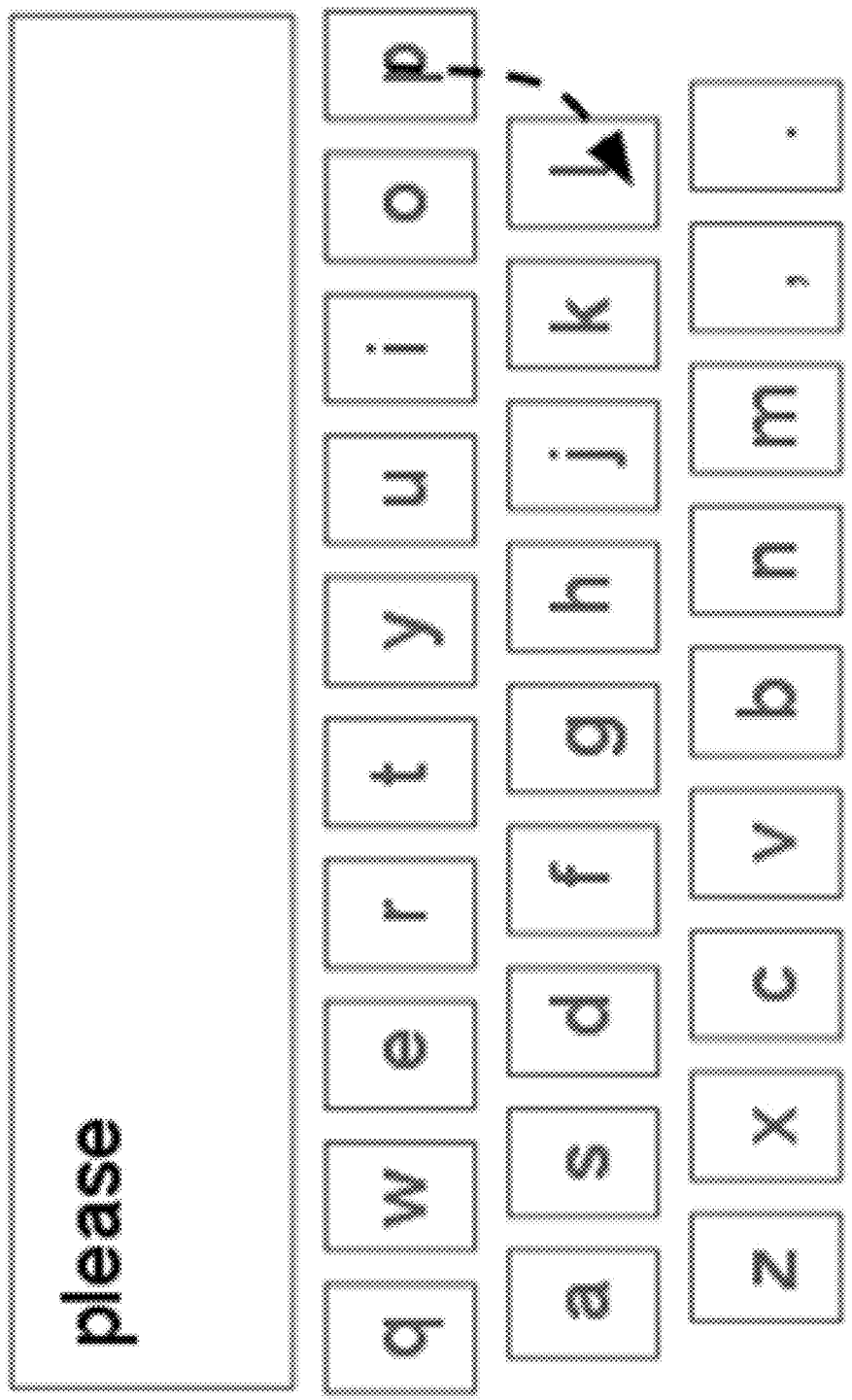
FIG. 2 is an illustration of the use of the method and system of the present invention and, in particular, illustrates a single continuous user gesture across a user interface comprising a gesture-sensitive keyboard to input a prefix to a word and the corresponding predicted word which is displayed on a display of the user interface.

FIG. 2, shows an example of a user's gesture to indicate a prefix for a word, in this example the prefix being "pl" for the word "please". In this example, the most probable word for the beginning of a sentence (i.e. a prediction where there are no words for context) given an input gesture passing through "p" and "l" is the word "please", so this word is displayed by the system in a display pane of a user interface comprising the touchscreen keyboard. The use of contextual evidence provided by a probabilistic context model, as will be discussed below, allows the system and method to take into account context information for smaller strokes, such as a prefix of a desired word, which will improve the accuracy of the text predictions provided to the user.

The examples illustrated in FIGS. 1 and 2 relate to inputting text using a virtual keyboard which does not include a spacebar, however, the invention is equally applicable to text inputted by a gesture across a keyboard including a spacebar. The system and method of the present invention enables a user to input multiple words via a single continuous gesture. Owing to the way in which the text predictions are generated, it is possible for multiple words or a phrase to be inferred from a single continuous gesture, even in the case where the user does not indicate word boundaries.

With reference to the remaining figures, the specifics of how the invention is realised will be described below in accordance with an example method and system.

As stated above, the method and system of the present invention samples the location of the gesture with time as the gesture is being performed. For a touchscreen device, pressure values can also be sampled at the same time as location to provide further information about the word/phrase the user's stroke is intended to represent. The sampling of location and/or pressure values may be carried out in any way known in the art. The system and method models this continuous stream of user input samples to provide term/word/phrase predictions. A stroke input can be defined as a (potentially infinite) sequence of samples, s, where:

$$s=\{x,y,p,t\}$$

The values x and y are merely coordinate values representing the physical location of the user's finger at the time of sampling, p is a pressure reading and t is the time at which the sample was taken. Thus a stroke, S, is given as:

$$s=\{s_1, s_2, \ldots, s_\infty\}$$

This provides a definition of the core input requirement for the system. The system functions to convert the input stroke into an estimate of the probability of the sample sequence representing a particular character sequence C at the point in time when a prediction is requested:

$$p(\{s_1, \ldots, s_n\}|C)$$

In this probability estimate, n is defined as the index of the sample where t represents the most recent sample. C is a prediction of what the user intended to enter via the stroke and comprises a set of characters which may include spaces. This estimate can be used as an extra evidence source to any other system or method which makes term/word/phrase predictions on the basis of multiple evidence sources, for example the system and method as described in international patent application no. PCT/GB2011/001419, entitled "Text prediction engine, system and method for inputting text into electronic devices", the content of which is incorporated herein by reference in its entirety.

The system of the present invention is preferably configured to continually provide this probability estimate, and may provide this estimate as input to the text prediction mechanism in international patent application no. PCT/GB2011/001419 which takes the estimate into account with other evidence sources (such as context) to generate more accurate text predictions.

Figure 3:
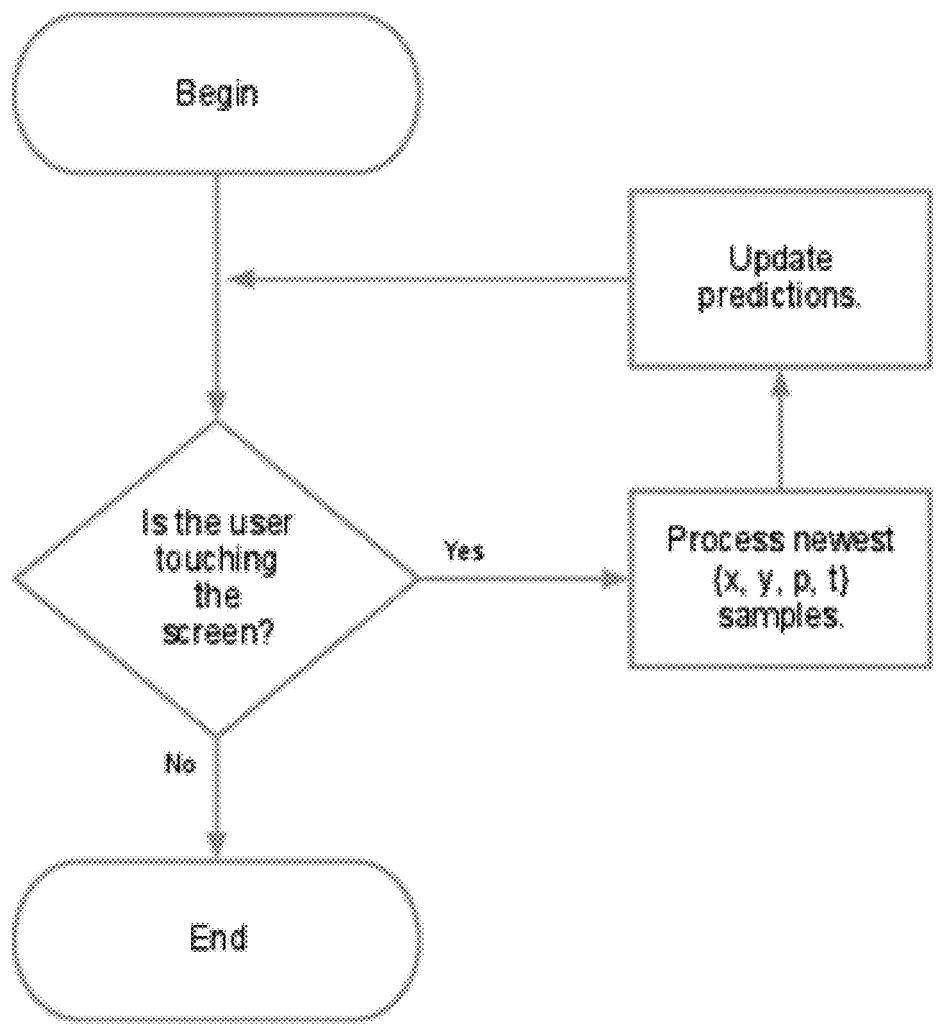
FIG. 3 is a flow diagram to illustrate the continuous processing of an input stream in accordance with the present invention.

As stated previously, the continuous stream of samples of the form $\{x, y, p, t\}$ needs to be processed to generate an estimate of the probability of the sample sequence representing a particular character sequence. This processing step is illustrated in FIG. 3. As shown, whilst the user is touching the screen and performing the stroke, samples are taken. The system continuously processes the sequence of samples generated from the stroke. Thus, whilst the user remains in contact with the screen, samples continue to be taken and these samples are processed along with all of the preceding samples of that gesture, to provide continually updated predictions with associated probability estimates. Once the user breaks contact with the screen, it is assumed that the stroke is finished and that there are no more characters/words from this point, for this particular stroke.

Figure 4:
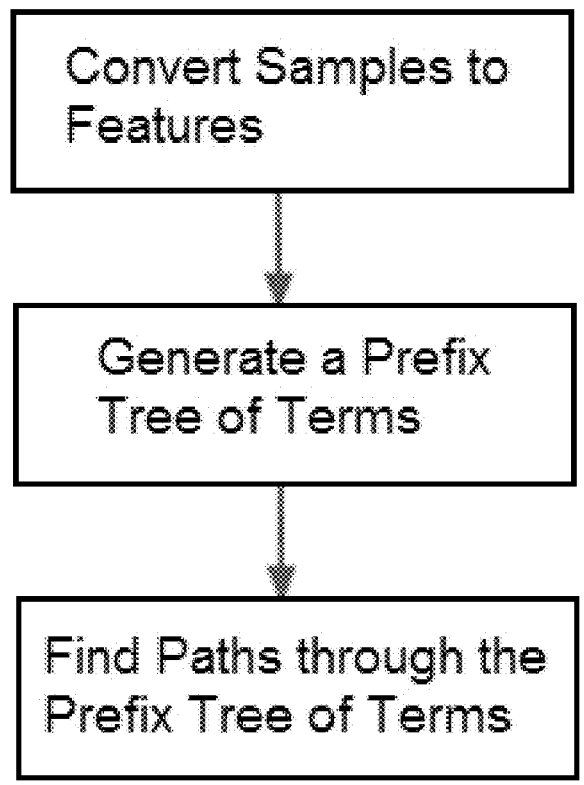
FIG. 4 is a flow diagram to illustrate the sub-process which is followed to convert input samples to update predictions in accordance with the present invention.

A sub-process is required to convert the sequence of samples of the form {x, y, p, t} into one or more candidate character sequences with associated probability estimates. FIG. 4 illustrates the conversion of 'raw' input samples into probability estimates/updates. As illustrated, a three-step process is provided to convert the raw samples into candidate character sequences with associated probability estimates.

As shown in FIG. 4, the first step of the sub-process is to convert the raw samples into a sparser sequence of more abstract "features", where each feature may represent a candidate character for inclusion in the predictions (i.e. the candidate character sequence) along with distance metrics to be used for calculating probability estimates. The conversion of the raw samples into a sequence of features will be explained below.

Once the raw samples have been converted into features, the second step of the sub-process comprises generating a prefix tree of terms. The prefix tree of terms is generated from a reference dictionary prefix tree by retaining paths of the reference prefix tree which are valid given potential sub-sequences of features. The reference prefix tree is a complete prefix tree for an entire dictionary and is therefore a static read-only data-structure. The reference prefix tree can be stored in a memory of the system. In contrast, the prefix tree of terms is a dynamically generated prefix tree which is a sparse copy of the reference prefix tree incorporating only elements that are relevant to the stroke pattern. The prefix tree of terms is usually discarded after generating a prediction for a given stroke pattern. However, in some cases, it may be preferable to retain the prefix tree of terms to provide context evidence for the next predictions predicted from a consecutive stroke pattern, e.g. in a situation where there are two stroke patterns representing consecutive terms in a sentence/phrase.

The reference dictionary prefix tree can be any reference dictionary prefix tree known in the art, for example any of the references cited on http://en.wikipedia.org/wiki/Trie or a model of the English language based on English language text as discussed in International Patent Application Publication No. WO 2010/112841, entitled "System and method for inputting text into electronic devices", the content of which is hereby incorporated by reference in its entirety. In a preferred embodiment, the prefix tree of terms is represented by a graph and generating a prefix tree of terms comprises constructing a weighted, directional graph of the potential sub-sequence of features.

Given a reference dictionary prefix tree for relevant languages, a weighted, directional graph is constructed as follows:

Define a Node, N in a graph to be a pair, {f, t}, where f is the feature this node represents and t is the node in the reference dictionary prefix tree it corresponds to;

Define an Edge, E, to represent both the existence of a valid prefix tree connection from the character represented by a feature to some later feature and the cost associated with that path (cost functions are discussed below); and Build a graph as a set of nodes and edges from the features.

Preferably, the construction of the graph further comprises inserting a node into the graph if a node t is present in the reference dictionary prefix tree, even if a feature has not been identified by the feature identification means for this character. By inserting a node into the graph when such a node exists in the reference dictionary prefix tree, the system and method is able to increase the accuracy in correcting misspelt or mistyped words. The insertion of nodes into a graph, when there is no identified feature corresponding to the character associated with that node will be explained in greater detail below, along with a discussion of the cost of the graph edge, i.e. the cost that is assigned to the inserted node.

Although estimates of the probability for each candidate word or phrase are required, it is more natural to work with the concept of a "cost" when dealing with graph edges. Therefore, in the description that follows the probability associated with a given path is often stated in terms of the cost of that path. The probability, p(C), of a candidate, C, can be derived based on its cumulative cost, c, from root to terminal node in the graph as follows $p(C)=e^{-c}$ or, reflexively, the cost can be obtained from a probability estimate with $c=-\ln(p(C))$.

Thus the system and method of the present invention, at the second and third steps of the sub-process, has a first reference dictionary prefix tree (which is stored in a memory of the device) and a second, dynamically generated, prefix tree (which we have referred to as the prefix tree of terms or the graph). The use of a static reference prefix tree and a dynamically generated prefix tree enables efficient continuous prediction by providing a straight-forward resume operation when one gesture is a prefix of another. It also allows for the use of path-finding algorithms to efficiently explore the tree (which will be apparent from the description of step three in the sub-process which follows). The dynamically generated tree is used for the lifetime of a single gesture (or for the lifetime of the next gesture if the first gesture is a prefix of the next gesture), then discarded whereas the static prefix tree is retained unmodified. The terms 'prefix tree of terms' and 'graph' are used interchangeably, since the prefix tree of terms has cost values associated with the connections between the nodes.

Returning to FIG. 4, the final step in the conversion of the raw input samples into predictions with associated probability estimates is to locate valid paths through the prefix tree or graph. Paths through the prefix tree of terms represent possible predictions of the candidate character sequence. The cheapest or most probable paths through the prefix tree or graph are returned as the updated predictions in the flow chart of FIG. 3. In one embodiment, a path-finding algorithm can be used to locate the cheapest (or most probable) paths through the prefix tree or graph. Any path finding algorithm known in the art can be used, for example Dijkstra or A*. However, alternative approaches to identifying the most probable paths can be employed, as will be discussed later. The probability estimate for a given prediction is derived from the cumulative cost through the features of the graph or prefix tree for that given path. The implementation of a cost function, to provide a cost to each leaf of the prefix tree, is discussed later.

The predictions and their associated probability estimates can be provided to the system described in international patent application no. PCT/GB2011/001419 as an evidence source for the overall prediction probability.

The preferred method, which represents the prefix tree by a graph, makes use of graph theory techniques to manage the combinatorial complexity caused by continuous sampling. The sequence of features generated from the raw input samples represent far more characters than the intended user input. By finding paths through the graph, possible subsequences of the full feature sequence are selected. Furthermore, by generating a graph/prefix tree which is a sub-graph of the reference dictionary prefix tree, the path finding algorithm is made more efficient at searching for valid paths. An additional benefit derived from generating a graph/prefix tree from the reference dictionary prefix tree is that it is possible to efficiently and accurately correct misspelt or mistyped words, which can, in part, be achieved by retaining certain letters of the reference dictionary that have not been identified as features.

If the sequence of features is modelled as an ordered set, F, all of the possible sub-sequences are the power set of F. That is, a set containing all of the possible subsets of F.

$$F=\{f_1, f_2, \ldots, f_n\}$$

$$P(F)=\{\emptyset,\{f_1\},\{f_1,f_2\},\ldots\}$$

If n is the number of features derived from the sample input so far, the growth of P(F) is given as:

$$|P(F)|=2^n$$

A naive algorithm considering all possible routes implied by some user input will be of super polynomial time complexity. The present method of graphing the combinations with some dynamic pruning and route prioritisation can help this problem. Such an approach will provide a high-level strategy for dealing with the search space complexity.

As stated previously, the problem of estimating predictions on the basis of raw input samples can be broken down into configurable sub-problems comprising identifying a sequence of features from the sequence of raw samples, generating a graph on the basis of the features, finding paths through the graph. Furthermore, probability estimates can be associated with the paths based on the cumulative cost of the path through the graph.

To reduce computational complexity, a set of paths of the graph can be pruned at a given time, based on their cumulative cost up to some point. For example, a path may be removed (pruned) where the updating of the probability estimate for that path decreases such that the ratio of the probability estimate for that path to the probability estimate for the most likely path (for all the paths) falls below a threshold value.

Returning to the steps of the sub-process as described in FIG. 4, the system requires a feature identifying means, a graph (or prefix tree of terms) generating means and a path finding means. In the present case, the system and method use an algorithm comprising a feature identification algorithm, a graph generating algorithm, and a path finding algorithm. The graph generating algorithm can be broken down into two different phases, where either part can be replaced to achieve different performance or quality characteristics. The first part is a "cost function" which assigns weights between possible connections in the graph/prefix tree of terms. The second part is an (optional) pruning function which can be used to dynamically discard routes through the graph that appear too expensive early on. The pruning function provides the advantage of improving performance of the graph construction algorithm (potentially at the cost of accuracy).

If the "cost function" is configured to assign the cumulative cost to each of the nodes in the prefix tree of terms, then a path finding algorithm configured to find the cheapest route is not needed, because the cheapest path can be determined by the cumulative cost values assigned to the leaves (as will be explained in more detail later). Thus, in this case, the algorithm need only comprise a feature identification algorithm and a graph generating algorithm. The predictor is configured to sort the paths by their cumulative cost to the target node and output the sequences the paths represent with an associated probability as predictions.

The individual steps in the sub-process will now be described in more detail. Returning to the first step, a feature identification algorithm is configured to generate features from the raw input samples. A feature is defined to represent a point on the stroke where the user may have intended to pass through one of the fixed targets (e.g. target points or target lines) on the keyboard. The feature identification algorithm need only generate a number of such optional features from the input samples (since the graph generating algorithm calculates the costs of including or skipping a feature).

A feature can be described by the following set of values:

$$f_i=\{t_i,l_i,d_i,s_i\}$$

where $t_i$ is the intended target, $l_i$ is the distance along the stroke to the feature, $d_i$ is the distance between the feature (on the stroke) and the location of $t_i$, and $s_i$ is the index of the closest sample to the feature. Features described in this way can only ever apply to a single 'target' on the keyboard (targets may have an approximately one-to-one mapping to characters). For example, a feature for the 'z' target will never result in an 'x' being added to the input. For this reason, targets cannot be computed from stroke topology alone—they are defined based on the topology and keyboard layout.

Figure 5:
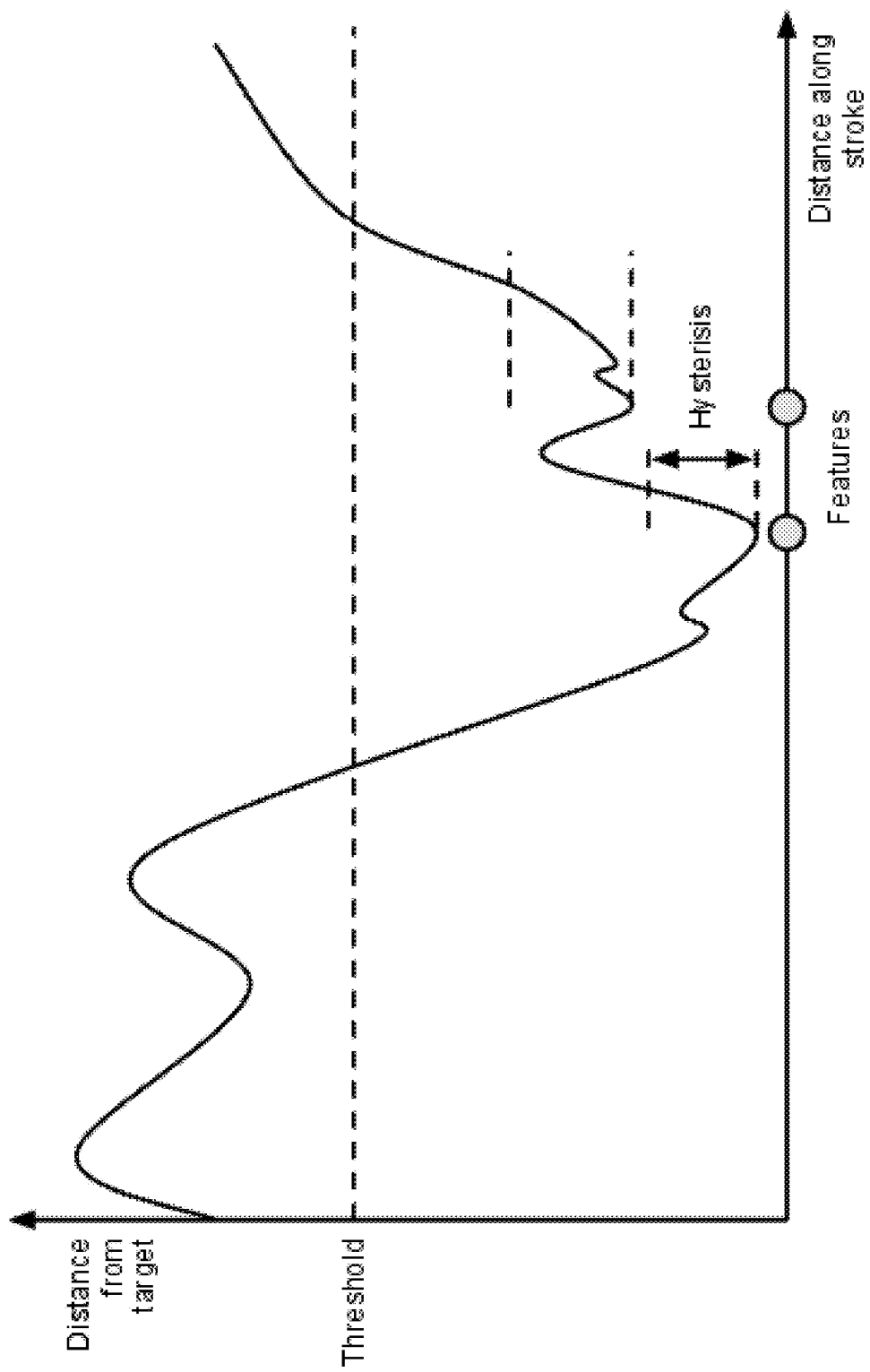
FIG. 5 illustrates a view of a feature generating algorithm with threshold and hysteresis in accordance with the present invention.

The feature identification algorithm adds features independently for each target on the keyboard, adding a feature at the local closest approach between the stroke and the target. A local closest approach is a local minimum in the separation between stroke (curve) and target (e.g. point or line). In the case where the target is a point (e.g. representing a character key on a virtual keyboard) the separation can be computed directly. However, other types of target can be used, for example the target may be represented by a line, which could be straight or curved (e.g. in the case of a space bar on a virtual keyboard). In the case of a line-target, the feature identification algorithm computes the point along the line that represents the location at which the distance between the stroke curve and the target line is at a minimum. This point is then used to compute the separation, as for a standard point target. If the stroke curve crosses the target line, then the separation between the stroke curve and the target line will be zero, and the feature will be added at the point where the curve crosses the line. As shown in FIG. 5, the granularity of the local minimum detection is defined by the hysteresis of the feature detector, since there is latency between the sampling of the stroke and the identification of a feature.

The stroke is unlikely to be smooth, because the user is most likely human (however, it is possible to use a smoothing algorithm if desired). The distance of the unsmoothed stroke from the middle of a key will fluctuate as the user passes it, potentially creating many local minima. It is preferred to configure the feature identification algorithm to identify features at points on the curve where there is some local minimum that is "significant". The hysteresis constant provides a means of defining a value by which the distance from the target needs to have fluctuated in order for the minimum to be significant and a feature to have been identified. The graph of FIG. 4 shows four local minima below the threshold distance, where only two of the minima are considered significant.

The advantage of hysteresis is that it is possible to avoid adding too many features with an unsmoothed stroke. Additionally, features are only added if the separation between feature & target is less than the threshold of the feature detector (see FIG. 5).

Once the features have been identified, the next step (see FIG. 4) is the generation of a prefix tree or graph which comprises those features. In the preferred embodiment, the system and method uses a graph generating algorithm.

Figure 6B:
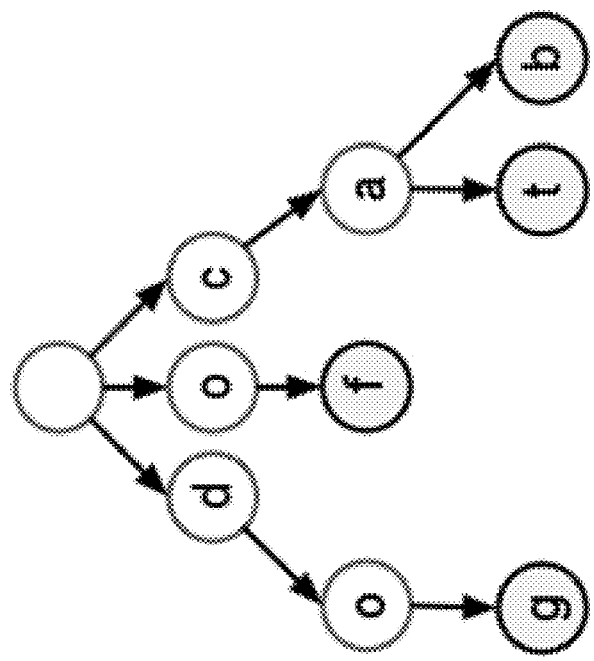
FIGS. 6a and 6b illustrate the generation of a prefix tree of terms (FIG. 6a) from a reference prefix tree (FIG. 6b) representing a dictionary in accordance with the present invention.
Figure 6A:
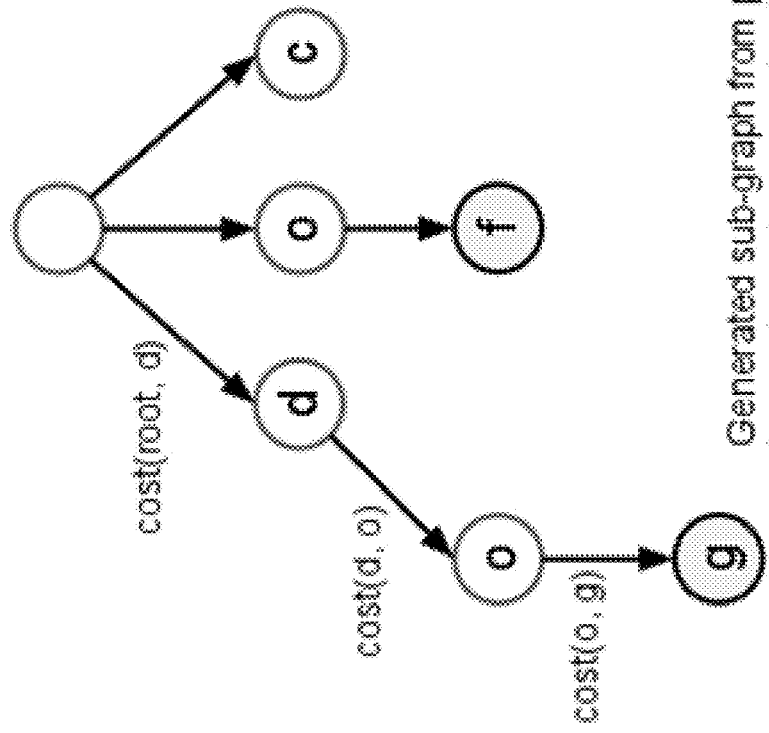

The desired output for a graph generating algorithm is described with reference to FIG. 6a. A reference dictionary prefix tree is illustrated in FIG. 6b. The generated prefix tree of terms (or graph) is illustrated in FIG. 6a. As can be seen, the generated prefix tree/graph comprises only the relevant routes through the reference dictionary prefix tree, i.e. only those routes which are valid on the basis of the features.

The graph/prefix tree thus describes the word sets relevant to the features only. As can be seen, the prefix tree/graph is directional, because the features of the sequence remain in order within the graph, however, features from the full sequence of features can be skipped, e.g. for the input features c, d, o, f, g, h, the word 'dog' is a valid route, where the features c, d and h have been skipped. As stated previously, the features identified by the feature identifying algorithm represent more characters that the user will have intended to input, but features can be skipped by the graph generating algorithm.

In addition, the graph generating algorithm is preferably configured to insert into the graph/prefix tree a node representing a character that was not identified as a feature by the feature identification algorithm, if that node is in the dictionary prefix tree and is part of a valid path given the identified features. By way of non-limiting example, assume that the feature identification algorithm identifies the features 'c, d, o, f, g, h, t' in the example described above (in relation to FIGS. 6a and 6b). The graph generating algorithm would insert the node representing 'a' into the graph/prefix tree with a corresponding cost associated with its insertion, such that 'cat' is an additional path provided in the graph/prefix tree of FIG. 6a. The way is which costs are assigned to inserted nodes will be described below.

In the prefix tree, valid points at which to end a word, according to the provided reference dictionary, are represented with a terminal node. The terminal nodes are highlighted with bolder borders in FIGS. 6a and 6b to distinguish them over the non-terminal nodes. Note that all edges in the generated prefix tree/graph will have a cost associated with them, but for brevity only one route is shown in this example. Additionally, features are represented as merely the characters they are most likely represent. In practice, a feature would have other data associated with it related to the cost function being used.

There are many ways to construct a graph and different approaches will offer different performance characteristics or compromises in flexibility. The preferred algorithm uses a depth-first recursive construction method, i.e. the graph/prefix tree of terms is constructed (by the graph generating algorithm) in the order that the nodes of the graph/prefix tree of terms would be visited by a depth-first search. The algorithm is configured to incorporate pruning at each recursive step.

Preferably, the prefix tree or graph generating algorithm covers implicit character repetition by considering any feature to possibly represent repeated instances of the character they represent, if there is a valid prefix tree route for it. Should this occur, the cost function will be called with the same feature as both parent and child parameter. The cost function implementation will have a rule for assigning sensible cost values to repeated features.

By way of a non-limiting example, an implementation for features, f, f' can be as follows:

$$\text{cost} = s(f) * c(f', f)$$

where s(f) is a function that works with the "separation" distance (the distance from the feature f on the stroke to the key centroid) and c(f', f) is a function that works with the "curve distance" delta, which is the distance between the two features on the curve. c(f', f)=1 if f' and f are the same, so only the separation component is taken into account.

The final step in the sub-process comprises identifying valid paths and the probabilities associated with those paths. The cumulative costs at each terminating node will be used to calculate word probability.

In the particular case illustrated in FIGS. 6a, the predictions for the given user input would have been "dog" and "of". These are the only two words possible given the input sequence provided, and they have a set of independently calculated cost values associated to them for use with calculating their probability later. However, in the alternative described in relation to FIG. 6a, there is the additional prediction of "cat" which has a calculated cost value associated with the prediction.

The system may be configured to call a cost function only for feature paths that the prefix tree shows are valid.

One approach might be to find least costly paths through the graph with a known path finding algorithm like Dijkstra or A*.

Another, preferred approach, is to record cumulative cost at each graph node as the graph is being constructed. Given the tree-like structure of the graph of the preferred embodiment, there can only be one route to each "leaf". That means, if there is a way of identifying sensible "target" nodes, the paths can be sorted by the cumulative cost to those points, and the sequences they represent can be returned very efficiently, without requiring a path finding algorithm.

Contrary to the known approaches, the present method does not limit the matching of the input stroke to a single word, as the graph structure created and the search methods outlined above contain a flexible representation of all the information. It is clear the same feature identification and graph generation can be used to predict words from features representing a prefix of a word only and a phrase from features spanning across multiple words.

The graph/prefix tree generation means effectively generates a sub-tree of the reference dictionary prefix tree with weights (or costs) added to it. Thus, it is possible to match prefixes because the route through the graph with the lowest cost should be the most probable prefix. To bias the cost calculation for features that cause a word to be completed, the concept of a "terminal node" can be added to the graph/prefix tree, where a terminal node representing the last character in a word has the cost associated with it weighted by some factor dependent on a space probability function, as will be described in more detail below. Terminal nodes are shown in the FIGS. 6a, 6b and 7 by a node which is shaded with a darker boarder, distinguishing it from non-terminal nodes.

To predict phrases comprising one or more words, word endings are identified by the graph/prefix tree generating means and the possibility of a space (or other word boundary delimiter) with an appropriate cost is incorporated into the graph, as is explained in greater detail below. This enables the system and method to chain words together, matching entire phrases if the input suggests this could be the desired output, irrespective of whether the user actually indicates word boundaries via their input (e.g. by gesturing across or close to a space bar on a virtual keyboard).

The graph generating algorithm can be configured to add a space character (or any other word boundary delimiter) to the graph as a child of some node N if:

N is terminal (a valid end of word)

The cost c for a path passing through the terminal node N given the space probability function meets the pruning criteria being used. In one example, a path is pruned if the ratio of the probability of that path over the probability of the most likely path falls below a threshold.

The cost that is associated with a space incorporated into the graph will be dependent on whether or not the feature identification means identifies a feature corresponding to that space. For example, a user may traverse the space bar during a stroke on a virtual keyboard to explicitly signal a word boundary, the feature identification means identifying the space as a feature. Alternatively, the user may not gesture across or close to the spacebar, for example because they have missed the spacebar out (e.g. in error or intentionally) or because the virtual keyboard omits a target to indicate a term boundary (e.g. a keyboard without a spacebar). In such a case, a space feature is not present in the set of features identified by the feature identification means.

Figure 7:
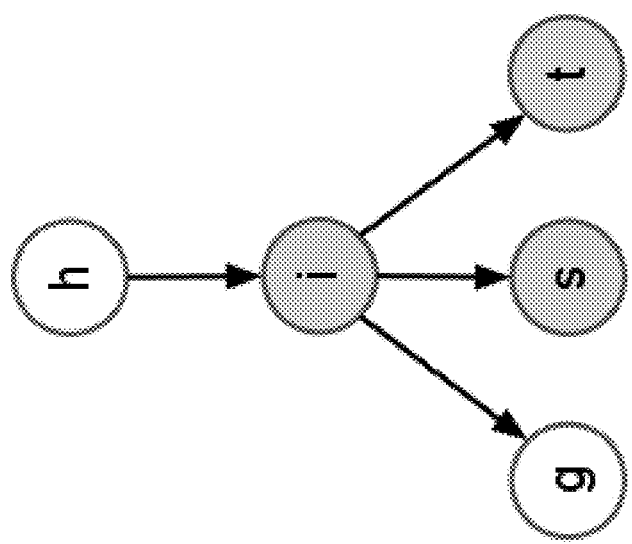
FIG. 7 illustrates terminal word endings in a prefix tree of terms in accordance with the present invention.

FIG. 7 illustrates an example prefix tree illustrating a terminal node N. The standard cost associated with the terminal node N is determined by a cost function, as is described in more detail below. However, the cost that is associated with a path through a terminal node is modified by the cost that is associated with the space node that follows.

In the case where a feature corresponding to a word boundary character (e.g. a space) is identified by the feature identification means, and this space feature corresponds to the space node (i.e. the space feature occurs at an appropriate place in the directional set of features, given the graph), the graph generating means associates a cost with that space node using the standard cost function, as described below.

However, if a space feature is not identified by the feature identification means, a penalty is applied by the graph generating means to the space node, since the space node was not explicitly identified by the user (thereby increasing the cost of a path that passes through the terminal node). This penalty is preferably a fixed cost.

In the case of a keyboard with no space bar (e.g. as shown in FIGS. 1 and 2), the graph generating means may be configured to assign a small penalty, e.g. a low fixed cost, to the space node, because the user is not able to explicitly identify a space between words. It some embodiments, the penalty for a space node following a terminal node could be dropped altogether. It may be advantageous to include a penalty for the space node, even though it is not possible to explicitly input a space, because this may give more accurate predictions, for example in the case where a user is more likely to input via a single gesture a single word or a prefix for a single word (rather than multiple words or a phrase).

Thus, a space node that has a higher associated cost will result in a path through the terminal node having a greater cost associated with it, which essentially amounts to increasing the cost associated with the terminal node.

As discussed previously, the graph generating algorithm can be configured to insert a node corresponding to a character where that character has not been identified as a feature, but is present in the reference dictionary tree, e.g. the graph generating algorithm can insert a node corresponding to a letter not identified by the feature identification algorithm. The graph generating algorithm assigns a penalty, e.g. a fixed cost, to the inserted node, in the same way that it assigns a penalty to a space node when that space was not identified as a feature. Preferably, the penalty assigned to an inserted node will be dependent on the type of character corresponding to that inserted node, e.g. the fixed cost assigned to a space node will be different to the fixed cost assigned to a letter node, which may also be different to a fixed cost assigned to a punctuation node other than a space node.

The determination of the costs of a path in the case where a character has been inserted without a corresponding feature being identified will be discussed below.

Figure 8:
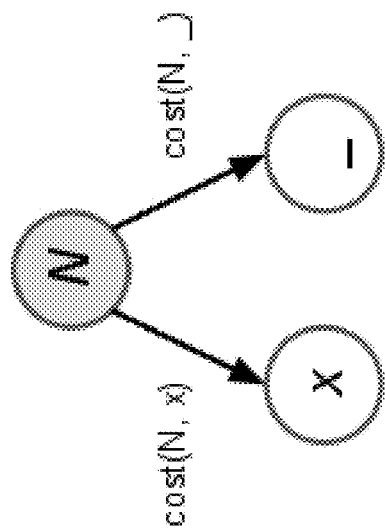
FIG. 8 illustrates how a prefix generating means of the method and system of the present invention deals with terminal word endings when generating a prefix tree of terms.

FIG. 8. shows how a space character is represented in the resulting graph. As stated previously, each node in the graph is paired with its corresponding node in the reference dictionary prefix tree. Nodes that follow a "space node" are paired with the root of the reference prefix tree, such that, effectively, a new sub-tree of the reference prefix tree is generated at each of the nodes (that follow the space character). This will mean that the algorithm can resume the prefix search appropriately for a new word. It is also possible to add some meta-data to the space node, so that contextual evidence can be used to prune the search continuing for the next word. Restarting the search at every possible space causes a massive increase in search space size. By using context information, it is possible to identify which words are likely to follow on from the space node, given the word or sequence of words preceding that space node. The cost value for a subsequent feature can be penalised if it represents a character for a word which is unlikely to follow the space node given the context information, thus enabling the context information to be used for pruning (since unlikely paths can be removed from the prefix tree).

Take an example in which a user enters the phrase "hi there" with a single stroke. The algorithm will have walked as far as "h->i" in the prefix tree and found that "i" is marked as a terminal node. A node representing a space character is added to the tree with an associated probability.

The likely words to follow "hi" and their associated probability can be attached to the space node and the cost function can be configured to take this into account when attaching subsequent nodes to that space node. An example system and method which uses context information to inform later predictions is disclosed in international patent application publication number WO2010/112841 or international patent application no. PCT/GB2011/001419, the contents of which are incorporated by reference in their entirety.

Therefore, an unlikely phrase (which is potentially valid for the same input pattern, such as "hi threw") can be assigned a much higher cost. A pruning function will likely eliminate that path early and reducing the paths in the prefix tree which need to be explored.

The graph construction algorithm outlined previously will consider any feature in the sequence of features to have potentially been a valid starting point. That is, any of those features may be considered an indication of what the first character of the first word should be. To reduce computational complexity, it can be assumed that there is some degree of accuracy in the user input and, in particular the start of the stroke.

As discussed in the preceding description, computational complexity can be greatly reduced if candidate roots and "targets" can be identified. A candidate root represents a feature corresponding to the first letter of the first word predicted for a given sequence of features, and thus should correspond to the target of the keyboard the user intended to start the gesture on. A target candidate represents a feature corresponding to the target at the end of the gesture, i.e. the target (e.g. character key) the user intended to touch at the end of the gesture, whereafter the user removes their finger from the screen.

Identification of target candidates is not used to limit the search space, but can be used for updating the candidate predictions, as it gives a sensible set of leaves to use for cumulative cost analysis. There are many more leaves in the prefix tree than there are 'valid ends' to the sequence of features, where a 'valid end' is a feature identified as a target candidate. Thus, by identifying target candidates it is possible to identify valid paths through the prefix tree and reduce greatly the number of nodes to which a cumulative cost is assigned. For example, in FIG. 6a, if the target candidate was identified as 'f' (i.e. the end feature of the sequence of features is 'f'), then the only valid path is "of" and the cumulative cost need only be assigned to the terminal node 'f'. In this instance, the system would predict "of" and not "dog" (or "cat" for the alternative example discussed).

By identifying candidate targets and storing cumulative costs at these targets, predictions can be made without the use of a path finding algorithm: Paths with valid end features are identified and cumulative costs are assigned to the nodes that represent the valid end features, allowing for determination of the most probable path by ordering the cumulative costs and identifying the path(s) with the lowest cost. The predictor is required only to calculate the probabilities for the least costly path(s) from the associated cumulative cost(s) and output the most likely paths as predictions.

The determination of a candidate root and a target candidate is now described. Several "reasonable" candidate roots are identified to play the role of the location coordinates, both x and y for the location of the first sample of the stroke S, as it would be needlessly limiting to restrict the search space to a single value for each, unless it is possible to do so with absolute confidence. Likewise, several "reasonable" target candidates are identified.

The desired starting character for the first word in the sequence being entered is likely to be close to the key centroid where the input began. To determine the root candidate, it can therefore be assumed that there is a sample and consequently a feature within some constant factor of the maximum key separation distance from the beginning of the input stroke. Likewise, the desired end character for the last term in the sequence being entered is likely to be close to the key centroid where the input finished and the user broke contact with the screen.

In a preferred embodiment, to identify a root candidate the method comprises determining a "curve distance" attribute within the features, l. The curve distance is defined by the following expression:

$$l(f_n) = \sum_{j=1}^{s(f_n)} \|s_j - s_{j-1}\|$$

Here $f_n$ is the nth feature, for which $s(f_n)$ is the index of the closest sample, and $\|s_j - s_{j-1}\|$ is the Euclidean distance between two adjacent samples. Thus the curve distance, l, of the nth feature is the sum distance along the sequence of samples, up to that feature.

The implementation assumes a constant for the maximum separation distance between two keys, k, as well as tuning parameters R and L for coefficients to be used in identifying root and target candidates from the input sequence respectively.

The above function assumes a linear relationship between user error and key separation. More sophisticated methods could be used, involving motion velocity, which can be calculated from time stamps associated with each feature, or potentially pressure readings.

The graph generating algorithm that has been discussed models the possible routes with respect to a prefix tree. This algorithm calls out to a cost function, which is how it attaches weights to the graph to incorporate the physical topology of the input patterns. As stated above, in addition to the graph generating algorithm calling out to a cost function, the graph generating algorithm can assign penalties, i.e. fixed costs, to a node inserted into the graph, where the character represented by that node has not been identified as a feature. Below, possible cost function implementations, based on curve length, average distance between user stroke and a reference stroke, stroke (trace) speed, and end-point detection are discussed.

Figure 9:
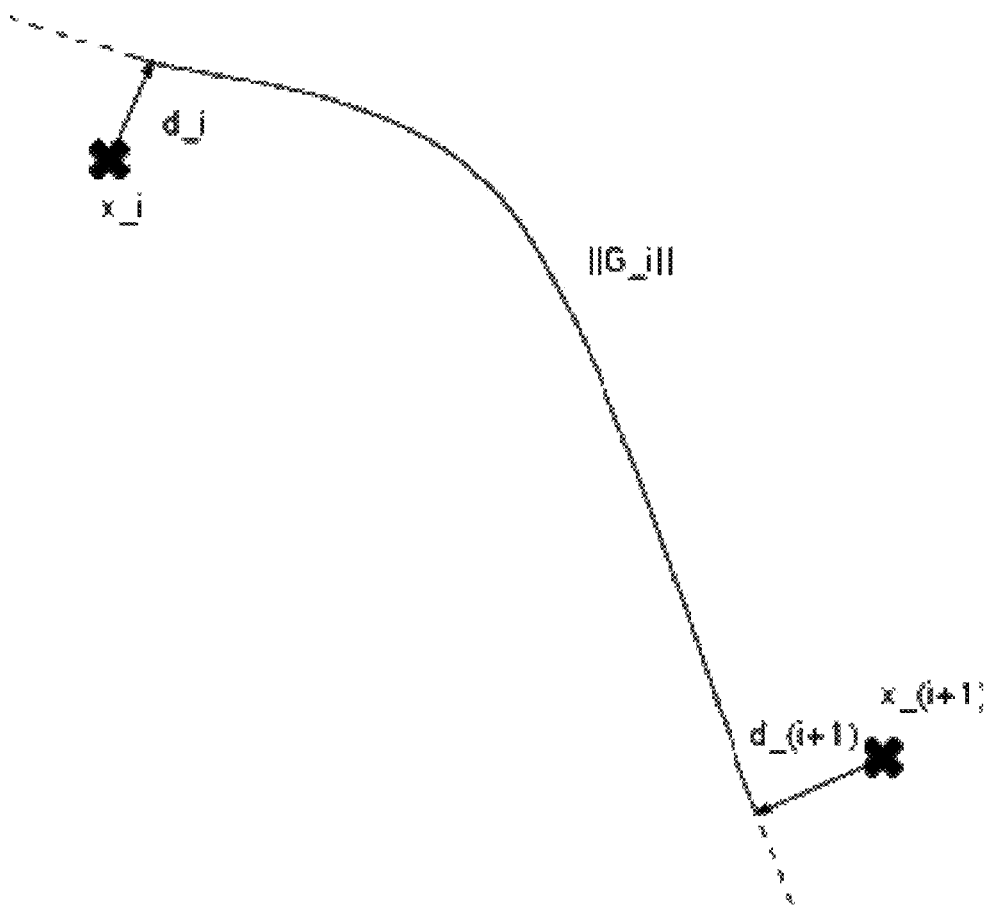
FIG. 9 illustrates the implementation of a cost function based on distance and length variables for a trace between two points in a gesture, in accordance with the present invention.

One cost function implementation is based on trace curve length as illustrated in FIG. 9. A simple first-order model for a user's trace between two points starts with the assumption that:

the ideal trace between two points goes through both points, and is the shortest possible distance The error model is such that increased distance from either point yields a less likely curve, as does a longer curve. It is obvious that the 'ideal user', in this scheme, will visit each character in turn, in a straight line from the previous character.

One simple error model in this scheme is the following:

$$p(s_i|f_i,f_{i+1}) = p_d(d_i)p_l(\|S_i\| - \|x_{i+1} - x_i\|)$$

where $S_i$ is part of the stroke (a sequence of samples), f and $f_{i+1}$ are features that delimit the partial stroke, $p_d$ is the distance error model, $p_l$ is the length error model, $d_i$ is the distance between the target and the stroke, $\|S_i\|$ is the length of the partial stroke, and $\|x_{i+1} - x_i\|$ is the straight-line distance between the two targets. The meaning of each of the variables is demonstrated in FIG. 9. Both distance and length error models may be Gaussian or exponential distributions, where the maximal probability is at zero distance or length error as appropriate. The equation above only includes a distance probability estimate for the first point, because the end of the current trace will form the start of the next, so the distance at the end, $d_{i+1}$, should be included in the estimate for the next pair of character targets.

Figure 10:
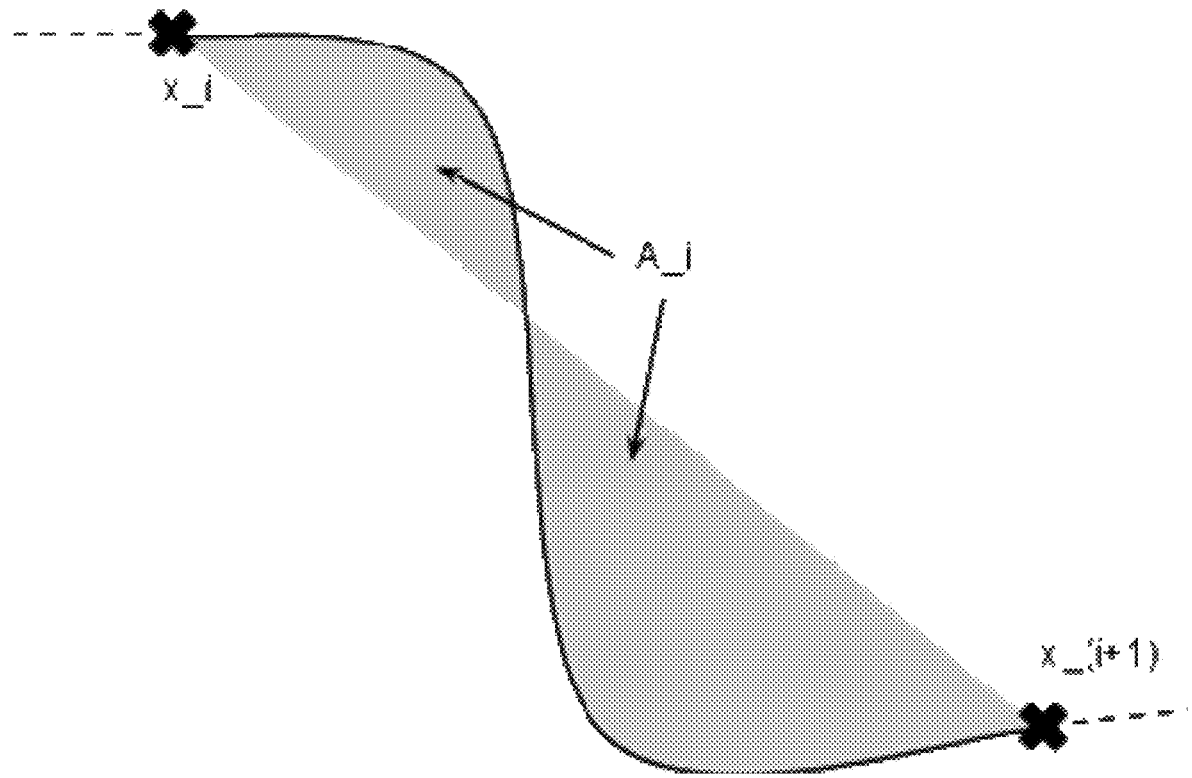
FIG. 10 illustrates the implementation of a cost function based on the area available for the trace between two points, in accordance with the invention.

Another way of encoding and evaluating the same assumption as the 'curve length' model (that a user takes the shortest path between two points) is to measure the average distance between the user's trace and a 'reference trace', as shown in FIG. 10. In the case of the shortest path assumption, the 'reference trace' is a straight line between the two keys. In this model, a possible error model is $$p(S_i | f_i, f_{i+1}) = p_a(A_i / \|x_{i+1} - x_i\|)$$

where $A_i$ is the area enclosed by the trace and the straight path between the features, as shown in FIG. 10. An exponential or Gaussian distribution are possible choices for $p_a$. In this model, the area and straight-line distance are simply being used to calculate the average distance of the trace from the 'best path'. In the same way, the 'best path' could be any other sort of idealized path, for example a Hermite spline through the target points, or a b-spline approximation to the target points.

An alternative implementation for the cost function is based on trace speed. Most known techniques for sub-trace modelling are based purely on topology; they do not take into account the fact that the trace additionally contains timing information, which may be used to derive 'trace velocity'. A complete model for trace input would include the speed of the trace. A simple model for trace speed might assume that:

the user's trace will have greatest speed between features, and lowest speed at features The error model penalizes traces with low speed far from features. Such a model could accumulate probability along the trace between the two features, as follows:

$$p(S_i | f_i, f_{i+1}) = p_d(d_i) e^{\int_{l_i}^{l_{i+1}} \log p_s(s(a);a) da}$$

where s(a) is the (possibly smoothed) trace speed as a varies between the starting and finishing curvilinear distance, and $p_s$ is low when the speed is low and the curvilinear distance between the start and end of the sub-trace is high.

Figure 11:
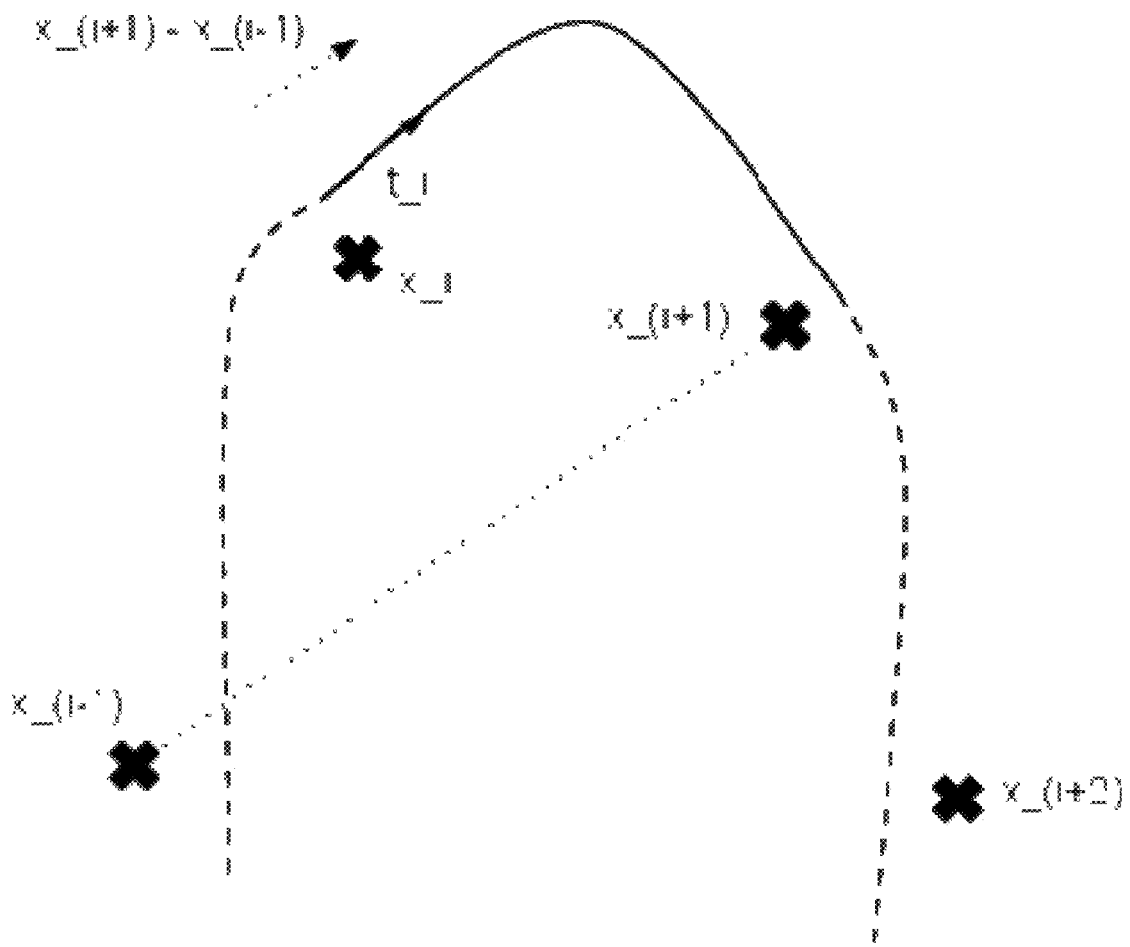
FIG. 11 illustrates the implementation of a cost function based on end-point directions for a trace between two-points given two neighbours, in accordance with the invention.

Another implementation of the cost function is based on end-point detection, as shown in FIG. 11. Curve direction can be determined trivially from the topology, and it is potentially a powerful way to incorporate neighbouring points into the trace model. If the 'ideal' trace is a Hermite spline going through the four points, the direction of the curve at $x_i$ is:

$$\hat{t}_i = \frac{x_{i+1} - x_{i-1}}{\|t_{x+1} - x_{i-1}\|}$$

the unit vector between the previous and next points. An error model using this might take the following form:

$$p(S_i | f_i, f_{i+1}) = p_d(d_i) p_t(t_i; \hat{t}_i)$$

where $t_i$ is the (possibly smoothed) direction vector of the curve at the start of the sub-trace. $P_t$ is a probability distribution that gives high probability to vectors in similar directions, and low probability to dissimilar directions. The various vectors and values involved are shown in FIG. 11.

Another implementation of the cost function may be based on curve direction. In the same way as average distance and speed errors can be summed up along the curve by integration, it is possible to assume a model for curve direction, and evaluate direction error over the whole curve and not just the end-points. A simple direction model could be of the form:

$$p(S_i | f_i, f_{i+1}) = p_d(d_i) e^{\int_{l_i}^{l_{i+1}} \log p_t(t_i(a); \hat{t}_i(a)) da}$$

which is just a continuous version of the end-point direction equation. A simple choice for the reference direction, $\hat{t}(a)$, does not depend on a and is simply the direction between the previous and next keys:

$$\hat{t}(a) = \frac{x_{i+1} - x_i}{\|t_{x+1} - x_i\|}$$

Alternatively, $\hat{t}(a)$ could be a linearly interpolated direction vector, between the direction vectors at $\hat{t}_i$ and $\hat{t}_{i+1}$ previously. A choice for $p_t$ is made in the same way as the End-point direction model.

The above described cost functions provide a cost for each feature node of a valid path through a graph/prefix tree. In the case of an inserted node where the corresponding character has not been identified as a feature, for example a space node, a letter node, a punctuation node, or a node representing the repeated instance of a feature, the cost function implementation precedes as described above to assign a cost to the feature nodes, where the inserted node is ignored for the purposes of calculating the costs. In the case of determining a cumulative cost of the path comprising an inserted node, this will be the cumulative cost of the feature nodes calculated by the cost function and the cost assigned to the inserted node.

For example, where the identified features of the path ("cat") were "c, t", the cost function will provide a cost for the feature nodes "c, t", as if the inserted a-node did not exist. The cumulative path cost will then include the penalty for inserting the a-node.

For a node inserted to represent a repeated feature, the cost assigned to that node is as described above (cost=s(f) *c(f', f)).

Thus, as discussed in the above, the present method and system provides a means of predicting words or phrases on the basis of a single continuous gesture which may represent a prefix for a word, a word or a phrase. The system and method achieves a flexibility in user input (e.g. not being limited to the gesture representing a single complete word, the gesture explicitly indicating word boundaries, or the user being required to accurately spell or type the intended word(s)) and text prediction by sampling (location, and optionally pressure, at a plurality of times) the gesture, as it is being performed on a gesture-sensitive keyboard.

As described above, to generate the word or phrase predictions from the samples, the samples are converted to features, the features are used to generate a prefix tree of terms or a graph representing a prefix tree of terms, and valid paths are identified through the prefix tree or graph, the valid paths representing prediction candidates. Cost functions are provided, which enable probability estimates to be associated with the paths (where the probability estimate can be device from the cost using $P(C) = e^{-c}$).

The words represented by the most probable paths can be returned to a user as a set of word or phrase predictions, for example by displaying on a display panel of a user interface. In one embodiment, only the most probable word or phrase is displayed to the user. Alternatively, the predictions and associated probability estimates can be passed to another system which may use them as an evidence source for a predictor which makes predictions on the basis of multiple evidence sources.

An example use of a touchscreen device in accordance with the present invention is provided below. As will be apparent from the preceding description, the system comprises a gesture-sensitive keyboard comprising a plurality of targets (e.g. points or lines) which is configured to receive a single continuous gesture as input from a user and a sampling means for sampling at a plurality of times the location of the gesture on the gesture-sensitive keyboard as the gesture is performed. Furthermore, the system includes a feature identification means configured to generate one or more features from the plurality of samples, a prefix tree generating means configured to generate a prefix tree of terms which includes the one or more features, and a path finding means configured to find one or more paths through the prefix tree of terms which are valid given the one or more features.

Figure 12:
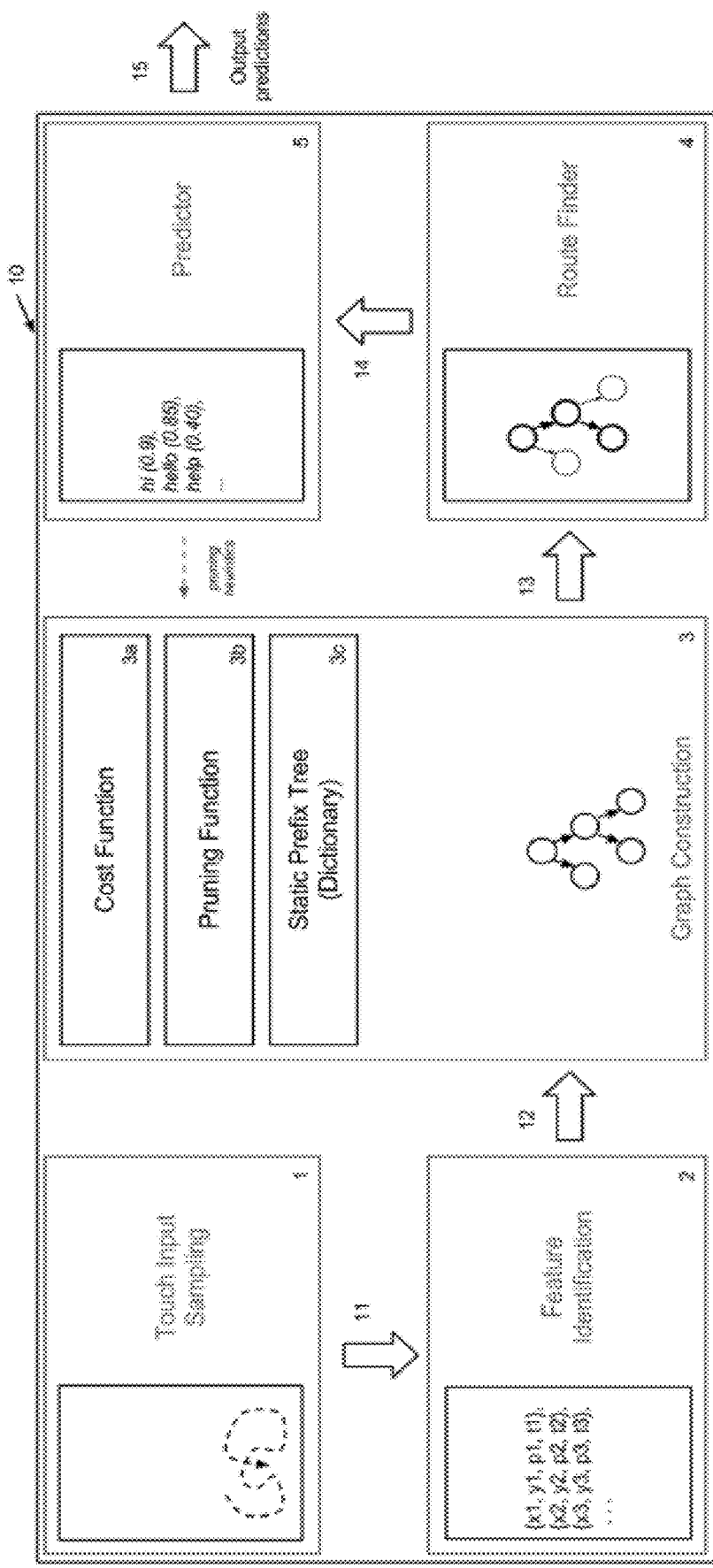
FIG. 12 is a schematic drawing of a system according to the present invention.

A system 10 in accordance with the present invention is illustrated in FIG. 12. The system 10 comprises a sampling means 1 configured to take samples 11 of the touch location at a plurality of times as the gesture is being performed. The samples 11 are passed to the feature identification means 2. The feature identification means 2 is configured to identify features from the samples 11, as described above in relation to the method.

The features 12 are passed to a graph/prefix tree of terms generating means 3 which is configured to construct a graph/prefix tree of terms 13 using the features 12. The graph/prefix tree of terms generating means 3 is configured to use a reference dictionary prefix tree 3c to generate a dynamic graph/sub-prefix tree of terms 13 which comprises paths of the reference dictionary prefix tree 3c which are valid given the features 12 that have been identified. The graph/prefix tree of terms generating means 3 comprises a cost function 3a which is configured to assign costs to the nodes in the graph/prefix tree of terms 13. In the embodiment where the system comprises a path finding algorithm, the cost function 3a assigns costs to each node in the graph/prefix tree of terms 13. However, in the alternative embodiment in which the system is configured to identify target nodes (as described above), the cost function 3a is configured to assign a cumulative cost to the target nodes.

The graph/prefix tree of terms generating means 3 preferably comprises a pruning means 3b. The pruning means 3b is configured to remove paths from the graph/prefix tree of terms 13 which have a low probability. Preferably, the pruning means 3b removes paths for which the ratio of the probability of a given path over the probability of the most probable path is below a threshold value. The graph/prefix tree of terms with associated costs (and optionally pruning) 13 is passed to a path finding means 4.

The path finding means 4 is configured to identify one or more of the least costly (and thus most probable) paths 14 through the graph/prefix tree of terms 13. The path finding means finds the one or more paths 14 by identifying the path(s) with the lowest cumulative cost at target nodes, e.g. by ordering the paths by their cumulative costs and returning the one more paths with the lowest cost(s), or by finding the least costly paths through the graph/prefix tree of terms 13 by using a path finding algorithm. The paths 14 are passed to a predictor 5 which generates predictions 15 on the basis of the paths 14. The predictions 15 comprise one or more words or phrases with associated probability estimates, where the word or phrases are formed from the features 12 which are represented by the nodes of the paths 14 and the probability estimates are determined from the cost associated with that path, as described above.

As described above, the predictions 15 represented by the most probable paths can be returned to a user as a set of word or phrase predictions, for example by displaying on a display panel of a user interface. In one embodiment, only the most probable word or phrase is displayed to the user. Alternatively, the predictions and associated probability estimates 15 can be passed to another system which may use them as an evidence source for a second predictor which makes further predictions on the basis of multiple evidence sources.

Example Use of the System of the Present Invention

The system 10 requires a description of the keyboard layout being used in order to convert the raw input samples 11 to the feature stream 12. For the examples that follow, the following configuration is used:

| Key | X | Y |
|-----|-------|-------|
| a | 24.0 | 120.0 |
| b | 264.0 | 200.0 |
| c | 168.0 | 200.0 |
| d | 120.0 | 120.0 |
| e | 168.0 | 120.0 |
| f | 168.0 | 120.0 |
| g | 216.0 | 120.0 |
| h | 264.0 | 120.0 |
| i | 312.0 | 120.0 |
| j | 312.0 | 120.0 |
| k | 360.0 | 120.0 |
| l | 408.0 | 120.0 |
| m | 360.0 | 200.0 |
| n | 312.0 | 200.0 |
| o | 408.0 | 40.0 |
| p | 456.0 | 40.0 |
| q | 24.0 | 40.0 |
| r | 168.0 | 40.0 |
| s | 72.0 | 120.0 |
| t | 216.0 | 40.0 |
| u | 312.0 | 40.0 |
| v | 216.0 | 200.0 |
| w | 72.0 | 200.0 |
| x | 120.0 | 200.0 |
| y | 264.0 | 40.0 |
| z | 72.0 | 200.0 |

An example use of the system 10 for a user intending to enter a prefix for a word and for a user intending to enter multiple words is described below in order to demonstrate the flexibility of the method and system for generating predictions from gesture input.

Prefix Matching

The system 10 is required to output the desired first one or more letters making up the prefix with sufficiently high probability, to enable a wider prediction system to use context and other sources to produce more accurate full word predictions from it. Alternatively, the system 10 can output a prediction 15 for display to a user on the basis of the identified prefix, by displaying the most probable word(s) that the prefix represents, without passing the prefix to a larger system.

As stated previously, the sampling means 1 of a system 10 samples the gesture as it is being performed to generate a sequence of samples 11, where the data in each sample consists of the position vector, a pressure reading and a time value.

Figure 13:
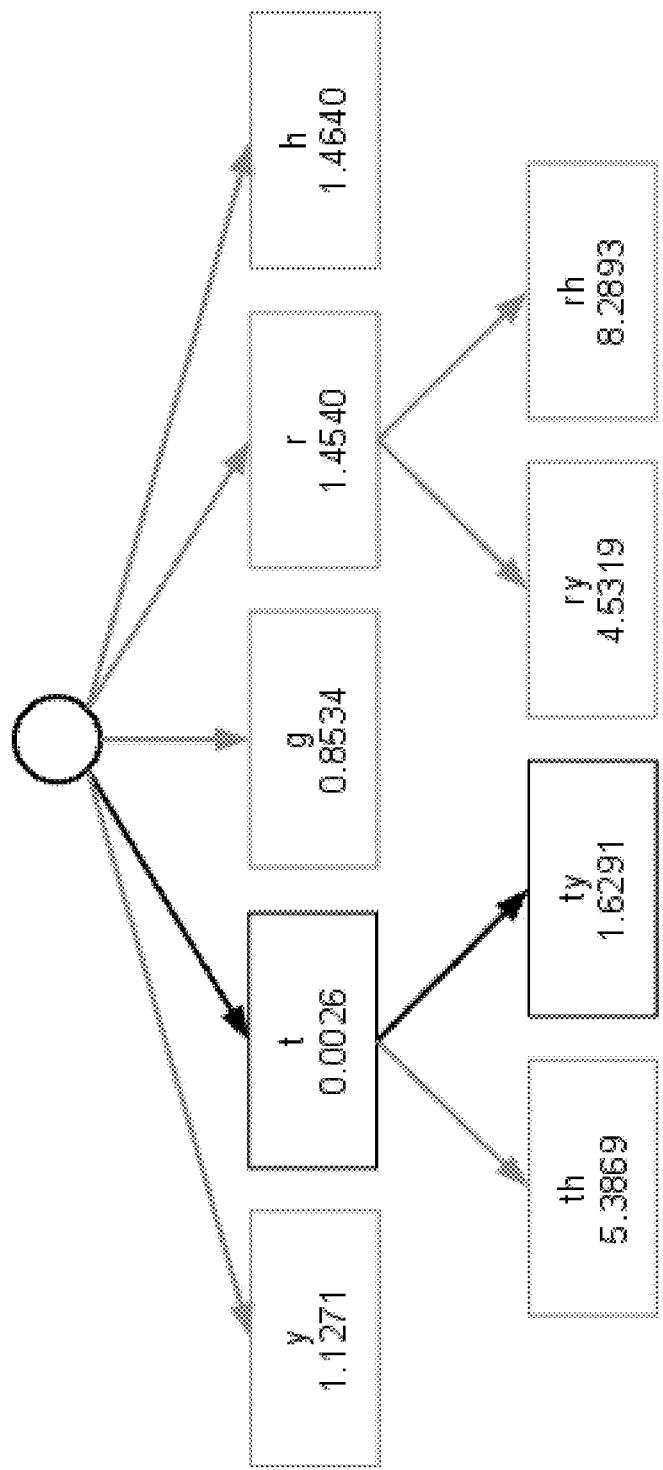
FIG. 13 illustrates an example use of the method and system of the invention and, in particular, a feature graph for the first few samples from an example single continuous gesture.

In the example, as shown in FIG. 13, the user has begun to enter the word "type" by moving their finger across the target "keys" of the keyboard, but the system 10 has only sampled a few samples 11 so far. The data below was taken from a device in which the sampling means 1 samples at ~60 Hz and time is measured in milliseconds.

| x | y | p | t |
|---|---|---|---|
| 218.14 | 40.04 | 0.46 | 0 |
| 218.52 | 40.93 | 0.47 | 13 |
| 218.52 | 40.93 | 0.47 | 22 |
| 218.53 | 40.93 | 0.48 | 34 |
| 220.92 | 50.12 | 0.49 | 46 |
| 222.69 | 55.78 | 0.50 | 57 |
| 224.83 | 62.08 | 0.50 | 71 |
| 227.11 | 70.64 | 0.50 | 81 |

The feature identification 2 means of the system 10 first converts the sample sequence 11 to a sequence of features 12, e.g. by using a feature identification algorithm as described above. In the preferred embodiment, the tuning parameters (the threshold distance and the hysteresis) for retaining features are a function of the minimum separation distance between keys. In the layout provided above, the minimum separation is 48 pixels. The following parameters are therefore used:

$$h = 0.5 * 48 = 24$$

$$h = 1.5 * 48 = 72$$

Where h is used as hysterisis and t as the distance threshold. The feature identification algorithm yields a set of features for the input samples 11 as follows.

| x | y | Features Identified, {c, x, y, s, t} |
|---|---|---|
| 218.14 | 40.04 | None - no previous values |
| 218.52 | 40.93 | {"t", 218, 40, 2.14, 0}, {"r", 218, 40, 50.14, 0} |
| 218.52 | 40.93 | None |
| 218.53 | 40.93 | None |
| 220.92 | 50.12 | None |
| 222.69 | 55.78 | {"y", 221, 53, 44.14, 13.6} |
| 224.83 | 62.08 | None |
| 227.11 | 70.64 | None |
| 229.00 | 83.86 | {"h", 229, 83, 50.31, 45.3}, {"g", 229, 83, 38.41, 45.3} |

The features 12 above consist of a target character, c, the coordinates x and y, a separation distance s and a time value, t. It can be seen that for the eight raw samples 11 provided in this example, a sequence of five features 12 is generated.

The next step is to feed the sequence of features 12 to the graph generating algorithm 3 to construct a graph 13 representing the possible combinations of features from the sequence of features 12. The possible combinations are cross-referenced with a prefix tree 3c representing the language dictionary being used. For this example, we will assume an English dictionary, thus a graph 13 is created containing valid prefixes of English words only, as shown in FIG. 13.

A cost function 3a of the graph generating means 3 can be configured to assign a cost to the nodes of the graph 13 which represent the features 12. To generate costs associated with the various combinations, a distance based cost function is used for this example. The distance-based cost function requires some parameters for the decay of the Gaussian and exponential functions it uses to assign a cost to the difference in curve length and distance. In the above example, it is assumed that these parameters are again a function of the key separation:

$$\delta = 0.7 * 42.0 = 29.4$$

$$\lambda = 0.4 * 42 = 16.8$$

Where $\delta$ is the decay parameter for the feature's distance from the key centroid, d, and $\lambda$ is the decay parameter for the difference in curve length between features versus the ideal shortest length, l. Thus, the cost values in FIG. 13 are calculated:

$$c = \frac{d^2}{2\delta^2} + \frac{l}{\lambda}$$

A path finding means 4 is configured to identify one or more paths with the lowest cumulative cost, by using a path finding algorithm or by ordering cumulative costs (in the embodiment where cumulative costs are stored at target nodes). A predictor 5 is configured to determine one or more probability estimates associated with the one or more paths 14 (from their cost functions) to provide one or more predictions 15, each of which comprises a prefix or word/phrase with an associated probability estimate.

The cumulative costs and probability estimates for the above example are shown below. In this example, the path finding means would have identified "ty" as the least costly path. The predictor 5 of the system 10 is configured to determine a probability estimate for each path, where $p(C) = e^{-c}$. The predictor 5 can be configured to output the one or more most probable prefixes as predictions 15.

| C | c | p(C) |
|---|---|---|
| "ty" | 1.6291 | 0.1961 |
| "ry" | 4.5319 | 0.0108 |
| "th" | 5.3869 | 0.0046 |
| "rh" | 8.2893 | 0.0003 |

This information can then be used alongside other evidence sources to produce a full-word prediction. Alternatively, this information can be used alone to predict the word that the user intended to enter via the gesture by returning the most probable full word given the prefix, e.g. in this example the most probable word with the prefix 'ty', or this information may also be used alongside a mechanism for improving predictions based upon a user's response to those predictions, as may be found in many known devices utilising touch-sensitive keyboards.

Multiple Word Matching

Figure 14:
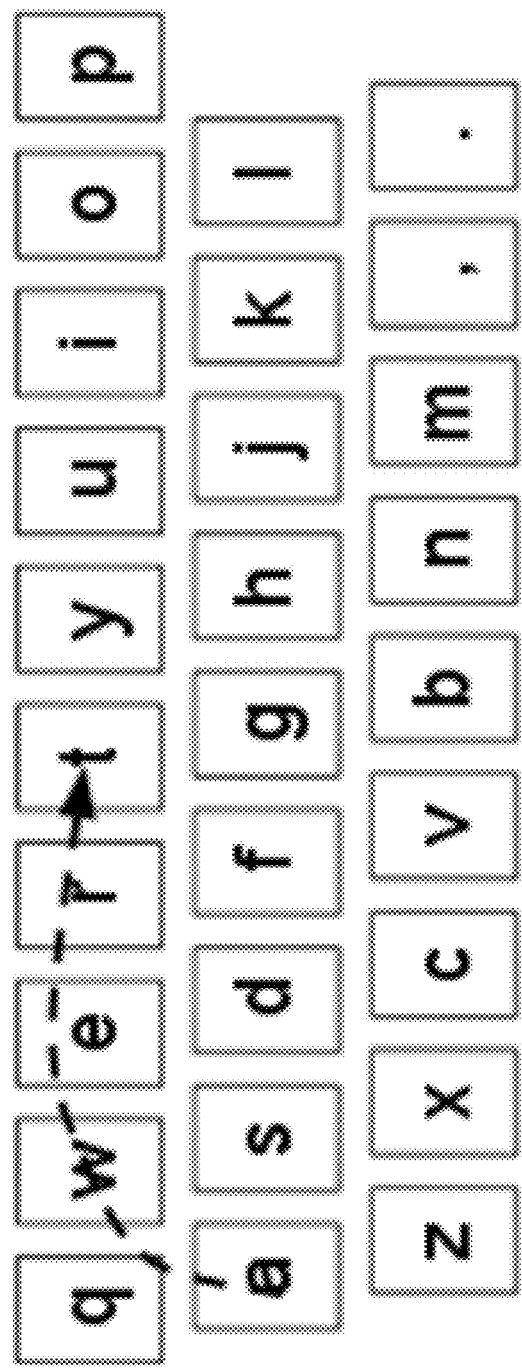
FIG. 14 illustrates an example use of the system of the invention and, in particular, a gesture across a gesture-sensitive keyboard for a user gesture intending to indicate the terms "a wet"

In this example, a user is trying to enter a phrase consisting of two words: "a wet" into a system 10, as shown in FIG. 14. The first stages of the process are exactly the same as for the prefix match example.

FIG. 14 shows the input stroke pattern and the table below is the raw data recorded for this stroke. This example stroke produces the following input stream samples 11, generated by the input sampling means 1.

| x | y | p | t |
|---|---|---|---|
| 17.8 | 120 | 0.4 | 0 |
| 19.7 | 118.4 | 0.4 | 74 |
| 20.6 | 117.6 | 0.4 | 88 |

-continued

| x | y | p | t |
|---|---|---|---|
| 24.9 | 109.8 | 0.4 | 103 |
| 35.2 | 95.7 | 0.6 | 118 |
| 41.3 | 86.3 | 0.6 | 132 |
| 47.4 | 78.5 | 0.6 | 147 |
| 48.8 | 75.4 | 0.6 | 162 |
| 50.7 | 69.9 | 0.6 | 177 |
| 52.6 | 65.2 | 0.6 | 192 |
| 53 | 63.7 | 0.6 | 207 |
| 53.5 | 62.1 | 0.6 | 221 |
| 54 | 59.8 | 0.6 | 236 |
| 54.9 | 55.8 | 0.6 | 251 |
| 57.7 | 46.5 | 0.6 | 266 |
| 62.9 | 30.8 | 0.6 | 281 |
| 64.3 | 29.3 | 0.6 | 297 |
| 64.8 | 28.5 | 0.6 | 310 |
| 65.2 | 27.7 | 0.6 | 340 |
| 65.7 | 27.7 | 0.6 | 355 |
| 66.2 | 27.7 | 0.6 | 385 |
| 66.2 | 28.5 | 0.7 | 400 |
| 66.6 | 28.5 | 0.7 | 429 |
| 67.1 | 28.5 | 0.7 | 444 |
| 69.4 | 30 | 0.7 | 459 |
| 78.4 | 33.2 | 0.7 | 474 |
| 100.4 | 36.3 | 0.7 | 489 |
| 116.4 | 37.9 | 0.7 | 503 |
| 132.3 | 39.4 | 0.7 | 518 |
| 149.7 | 38.6 | 0.7 | 533 |
| 167 | 39.4 | 0.7 | 549 |
| 180.6 | 39.4 | 0.7 | 564 |
| 192.8 | 39.4 | 0.7 | 578 |
| 201.3 | 39.4 | 0.7 | 593 |
| 203.6 | 39.4 | 0.7 | 608 |
| 206 | 38.6 | 0.7 | 623 |
| 206.9 | 38.6 | 0.7 | 638 |
| 207.4 | 38.6 | 0.7 | 653 |
| 207.9 | 37.9 | 0.7 | 668 |
| 208.3 | 37.9 | 0.7 | 682 |
| 208.8 | 37.1 | 0.7 | 697 |
| 209.7 | 36.3 | 0.7 | 712 |
| 210.2 | 36.3 | 0.7 | 728 |
| 211.6 | 36.3 | 0.7 | 742 |
| 213.5 | 36.3 | 0.7 | 757 |
| 215.8 | 36.3 | 0.5 | 772 |
| 222.4 | 38.6 | 0.3 | 787 |

The feature identification means 2 converts raw samples 11 into features 12, for example using a feature identification algorithm, to provide the following:

| Target Character | x | y | Separation | Curve Distance |
|---|---|---|---|---|
| A | 20.6 | 117.6 | 4.2 | 3.7 |
| S | 35.2 | 95.7 | 44.1 | 30.1 |
| Q | 56.7 | 49.8 | 34.1 | 81.4 |
| W | 74.9 | 31.9 | 8.6 | 116.5 |
| E | 120.2 | 38.3 | 1.8 | 162.4 |
| R | 168.0 | 39.4 | 0.6 | 210.3 |
| T | 217.1 | 36.8 | 3.4 | 260.7 |
| Y | 222.4 | 38.6 | 41.6 | 226.3 |

Figure 15:
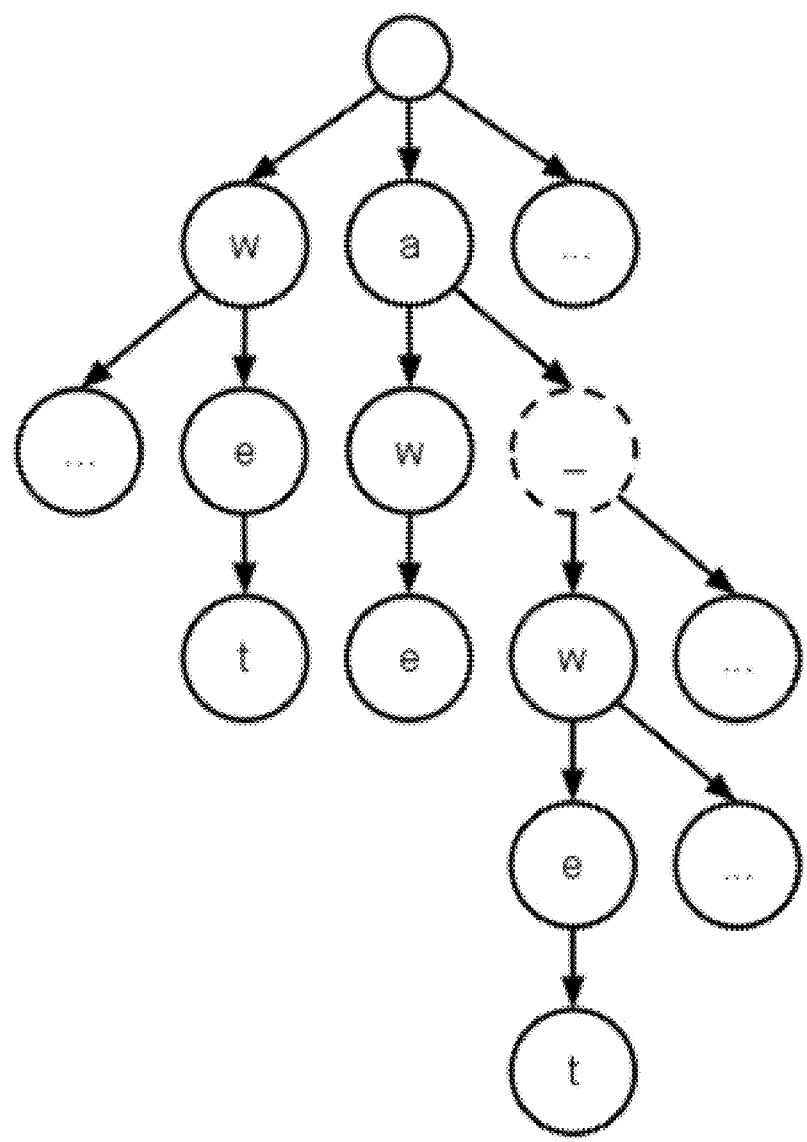
FIG. 15 illustrates a partial feature graph generated for the single continuous gesture as illustrated in FIG. 14.

As before, a graph 13 is constructed from the features 12 by a graph generating means 3 (e.g. a graph generating algorithm). The graph generated by a graph generating means 3 in the present example is illustrated in FIG. 15. The fact that "a" is a word by itself and is therefore a terminal node on the prefix tree will cause the graph generating algorithm to add a space node to the graph with an appropriate cost (i.e. a penalty), as explained above with reference to FIG. 8.

FIG. 15 illustrates where the construction algorithm inserts the space node in the graph. At that point, the search in the prefix tree resets, as explained previously, and any valid word from the root could be constructed from the remaining feature sequence. With this structure in place, the process for producing predictions is exactly the same as previously demonstrated. Thus, a path finding means 4 is configured to identify the least costly paths 14 through the graph 13 and a predictor 5 is configured to calculate a probability estimate for these paths 14 and to output one or more predictions 15. The leaves at the end of the graph represent the whole character sequence from the root, which now includes at least one space. Thus, as demonstrated, phrases comprising multiple words and space characters can be predicted by the present system and method.

As described previously, one or more nodes could have been inserted into the graph, had they been present in the reference dictionary prefix tree but not identified as a feature by the feature identification algorithm.

Furthermore, as explained previously, in the case where the user explicitly identifies word boundaries via the input gesture, e.g. by gesturing across or close to a space bar, the feature identification means identifies a feature associated with that term boundary, and the graph construction algorithm can be configured to assign a cost to the space node based on the cost function implementations discussed above.

As demonstrated by way of the examples, the present invention provides a means of generating prefix, word and phrase predictions from a single continuous gesture across a gesture-sensitive keyboard. Thus, the present method and system of generating text predictions and probabilities offers a significant advancement over known systems and methods. As will be understood from the preceding description, the present method and system allows subsequent information to influence earlier corrections. This is especially true when predicting a phrase where the second word entered can be used to help infer the first word. The system and method therefore provides increased accuracy of word and phrase predictions over the known systems and devices which merely match a gesture (to indicate a complete single word) to a word in a dictionary.

It will be appreciated that this description is by way of example only; alterations and modifications may be made to the described embodiment without departing from the scope of the invention as defined in the claims.

The invention claimed is:

1. A system comprising:
   a processor;
   memory storing instructions that, when executed by the processor, cause the system to perform operations comprising:
   sample at a plurality of times a location of a single continuous gesture on a gesture-sensitive keyboard as the gesture is being performed;
   generate one or more features from the plurality of samples, wherein the one or more features relates to one of a plurality of targets of the gesture sensitive keyboard indicative of a user intended input based on the gesture;
   generate a prefix tree of terms which includes the one or more features based on the single continuous gesture;
   select one or more paths through the prefix tree of terms given the one or more features based on a distance between the one or more features and the one of the plurality of targets; and
   predict one or more terms corresponding to the single continuous gesture from the one or more features.

2. The system of claim 1, wherein the instructions further cause the system to generate a graph by graph theory, wherein the graph represents the prefix tree of terms.

3. The system of claim 1, wherein the instructions further cause the system to generate said one or more features from the plurality of samples by identifying a location of the gesture on the gesture-sensitive keyboard indicative of a gesture intended to pass through a target of the gesture-sensitive keyboard.

4. The system of claim 1, wherein the one of the plurality of targets is a point target or a line target.

5. The system of claim 1, wherein the instructions further cause the system to identify a feature for plurality of targets.

6. The system of claim 1, wherein the instructions further cause the system to retain a feature only if the minimum distance between the feature and the one of the plurality of targets is below a threshold distance.

7. The system of claim 1, wherein the prefix tree of terms is generated by retaining the terms of a dictionary prefix tree which are allowed given the one or more features.

8. The system according to claim 7, wherein a term of the dictionary prefix tree is retained when a feature does not correspond to the term.

9. The system of claim 1, wherein the plurality of targets correspond to letters of the alphabet, and wherein:
   the prefix tree of terms comprises one or more nodes representing a last latter of a completed word; and
   the instructions further cause the system to insert a node corresponding to a word boundary delimiter into the prefix tree where there is a node corresponding to the last letter in the completed word.

10. The system of claim 9, wherein the instructions further cause the system to reduce a probability associated with a node corresponding to the word boundary delimiter, if a feature associated with that word boundary delimiter has not been identified.

11. The system of claim 10, wherein a new prefix tree of terms is generated at the node corresponding to the word boundary delimiter by retaining the terms of a dictionary prefix tree which are allowed given the remaining features in a sequence of one or more features.

12. The system of claim 11, wherein the instructions further cause the system to associate metadata with the node representing a word boundary delimiter to prune the new prefix tree of terms on the basis of context data.

13. The system of claim 12, wherein the plurality of targets correspond to letters of the alphabet or word boundary delimiters, wherein the instructions further cause the system to allow a given feature to represent a repeated instance of the character it relates to, by retaining the terms of a dictionary prefix tree which include character repetition if there is a valid path given the one or more features through the prefix tree for the repeated character.

14. The system of claim 1, wherein the instructions further cause the system to prune the prefix tree of terms to remove paths through a graph for which a probability of the path is below a predetermined threshold.

15. The system of claim 1, wherein each feature comprises a distance metric which corresponds to the minimum distance between the gesture and the one of the plurality of targets and wherein the instructions further cause the system to use the distance metrics to generate a probability estimate associated with each path through the prefix tree of terms.

16. The system of claim 15, wherein the instructions further cause the system to return as the one or more terms, terms for which a corresponding route has a probability estimate above a threshold value.

17. The system of claim 1, wherein the instructions further cause the system to:
   determine one or more features which correspond to an end location of the gesture; and
   assign an indication of a cumulative probability for a given path to any node representing the one or more features that correspond to the location of an end of the gesture, only if that node corresponds to a leaf of the prefix tree of terms.

18. The system of claim 1, wherein the one or more terms is predicted on the basis of currently available samples.

19. The system of claim 1, wherein the instructions further cause the system to periodically update the prediction for the one or more terms as the single continuous gesture is being performed and more samples are generated.

20. The system of claim 1, wherein the instructions further cause the system to predict one or more words on the basis of a single continuous gesture which corresponds to the user gesturing over one or more characters on a gesture-sensitive keyboard intended to indicate the prefix for that one or more word.

21. The system of claim 1, wherein the instructions further cause the system to predict a phrase comprising a sequence of two or more words on the basis of a single continuous gesture which corresponds to gesturing over characters for multiple words on a gesture-sensitive keyboard.

22. The system of claim 1, wherein the instructions further cause the system to use context information to tailor the prediction of the one or more terms.

23. The system of claim 1, wherein the instructions further cause the system to predict the one or more terms on the basis of a topography of the gesture-sensitive keyboard in combination with at least one of gesture velocity or gesture curve direction.

24. The system of claim 1, wherein the instructions further cause the system to predict a path through the prefix tree dependent on a topography of the gesture between two features and targets of the keyboard associated with those two features.

25. The system of claim 24, wherein a probability of the path is based on a monotonically decreasing function of a difference between a straight-line distance between the two targets and a curved length of the gesture between the two targets.

26. The system of claim 24, wherein a probability of the path is based on a monotonically decreasing function of a difference between a direction of a straight-line between the two targets and a gesture direction at each point between the two targets.

27. A method for predicting one or more terms from a single continuous gesture across a gesture-sensitive keyboard comprising:
   sampling at a plurality of times a location of the gesture on the gesture-sensitive keyboard as the gesture is performed; and
   predicting one or more terms from the plurality of samples by:
   generating one or more features from the plurality of samples, wherein the one or more features relates to a target on the gesture-sensitive keyboard indicative of an input based on the gesture;
   generating a prefix tree of terms which includes the one or more features based on the single continuous gesture; and
   selecting one or more paths through the prefix tree of terms given the one or more features based on a distance between the one or more features and the target to predict one or more terms corresponding to the single continuous gesture.

\* \* \* \* \*